(12) United States Patent
Kuramoto

(10) Patent No.: US 10,713,042 B2
(45) Date of Patent: Jul. 14, 2020

(54) ARITHMETIC PROCESSING DEVICE AND CONTROL METHOD FOR ARITHMETIC PROCESSING DEVICE

(71) Applicant: FUJITSU LIMITED, Kawasaki-shi, Kanagawa (JP)

(72) Inventor: Masahiro Kuramoto, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 16/015,789

(22) Filed: Jun. 22, 2018

(65) Prior Publication Data
US 2019/0004795 A1 Jan. 3, 2019

(30) Foreign Application Priority Data
Jul. 3, 2017 (JP) .................................. 2017-130527

(51) Int. Cl.
*G06F 7/544* (2006.01)
*G06N 3/04* (2006.01)
*G06F 17/16* (2006.01)
*G06N 3/06* (2006.01)
*G06F 17/15* (2006.01)
(Continued)

(52) U.S. Cl.
CPC .......... *G06F 9/3001* (2013.01); *G06F 7/5443* (2013.01); *G06F 7/57* (2013.01); *G06F 9/30036* (2013.01); *G06F 9/3824* (2013.01); *G06F 17/15* (2013.01); *G06F 17/16* (2013.01); *G06N 3/04* (2013.01); *G06N 3/0454* (2013.01); *G06N 3/06* (2013.01); *G06N 3/063* (2013.01); *G06N 3/084* (2013.01)

(58) Field of Classification Search
CPC ............. G06F 17/15–153; G06F 17/16; G06F 7/5435; G06F 3/04; G06F 3/06; G06F 3/063
See application file for complete search history.

(56) References Cited

U.S. PATENT DOCUMENTS 5,226,171 A * 7/1993 Hall ........................ G06F 17/16
712/3
5,577,262 A * 11/1996 Pechanek ............ G06F 15/8023
712/11
(Continued)

FOREIGN PATENT DOCUMENTS

JP 07-282237 10/1995
JP 2005-346470 12/2005

*Primary Examiner* — Matthew D Sandifer
(74) *Attorney, Agent, or Firm* — Fujitsu Patent Center

(57) ABSTRACT

An arithmetic processing device includes, a memory that stores a first data and a second data, a plurality of arithmetic circuits, a first memory arranged for each of the arithmetic circuits and that stores a first predetermined row having the predetermined number of the first data stored in the memory, a second memory arranged for each of the arithmetic circuits and that stores a second predetermined row having a predetermined number of the second data stored in the memory, and a plurality of multiply-add arithmetic circuits arranged for each of the arithmetic circuits, a number of the multiply-add arithmetic circuits corresponding to the predetermined number, each of the multiply-add arithmetic circuits that obtains a third data by executing the operation using the first data and the second data based on a result of performing a row operation which is an operation of one row of the first data.

5 Claims, 24 Drawing Sheets

(51) Int. Cl.
*G06F 9/30* (2018.01)
*G06F 7/57* (2006.01)
*G06N 3/08* (2006.01)
*G06F 9/38* (2018.01)
*G06N 3/063* (2006.01)

(56) References Cited

U.S. PATENT DOCUMENTS

| | | | |
|---|---|---|---|
| 5,854,636 A | 12/1998 | Watanabe et al. | |
| 6,401,106 B1* | 6/2002 | Juan | G06F 17/15 708/422 |
| 9,135,553 B2* | 9/2015 | Kato | G06F 17/15 |
| 10,248,384 B2* | 4/2019 | Komagata | G06F 9/46 |
| 2007/0271325 A1* | 11/2007 | Juffa | G06F 17/16 708/607 |
| 2015/0309961 A1* | 10/2015 | Ozaki | G06F 17/10 706/16 |
| 2018/0046458 A1* | 2/2018 | Kuramoto | G06F 9/3001 |
| 2019/0004795 A1* | 1/2019 | Kuramoto | G06F 7/5443 |

* cited by examiner

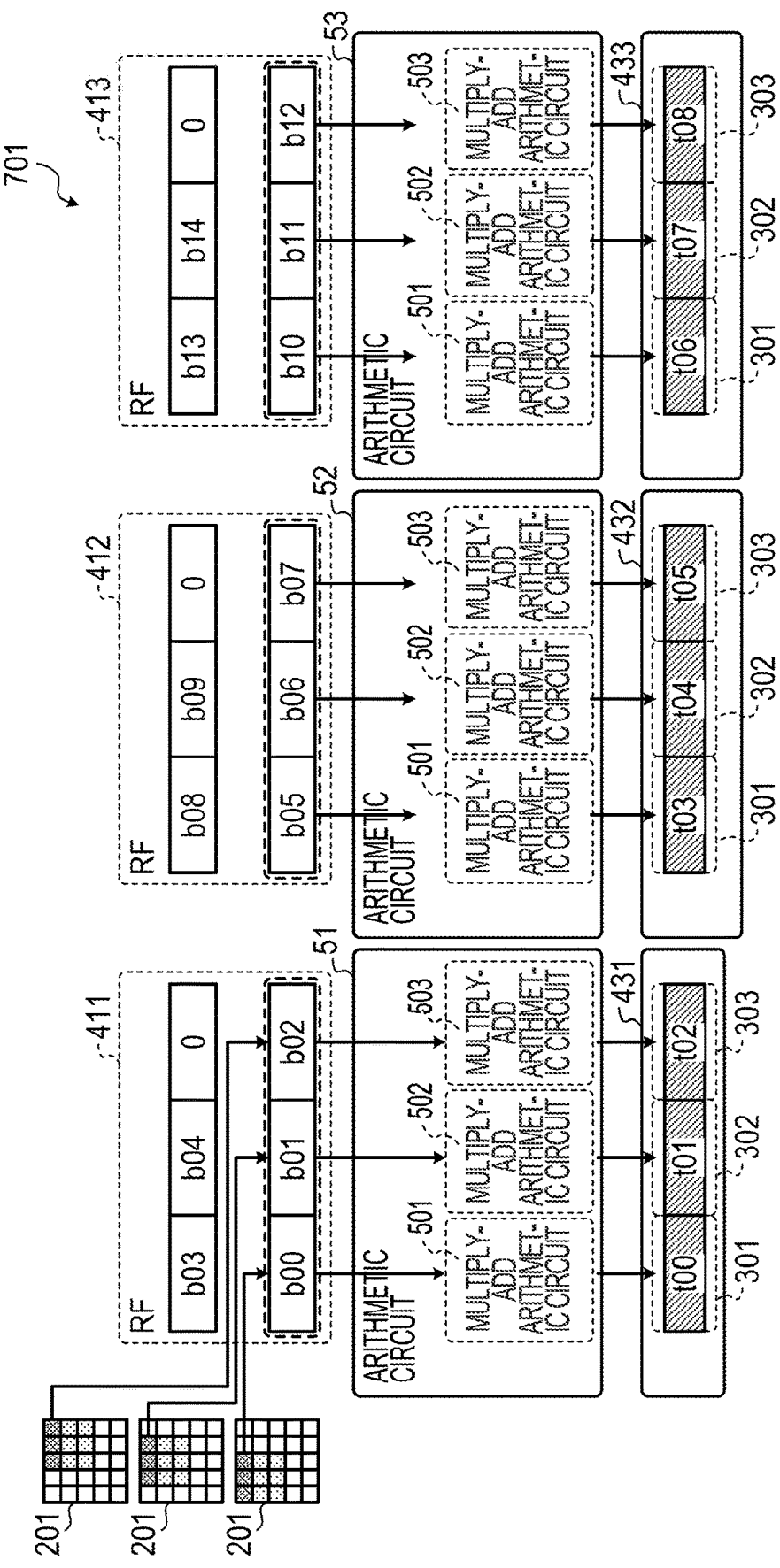

ARITHMETIC PROCESSING DEVICE AND CONTROL METHOD FOR ARITHMETIC PROCESSING DEVICE

CROSS-REFERENCE TO RELATED APPLICATION

This application is based upon and claims the benefit of priority of the prior Japanese Patent Application No. 2017-130527, filed on Jul. 3, 2017, the entire contents of which are incorporated herein by reference.

FIELD

The embodiments discussed herein are related to an arithmetic processing device and a control method for the arithmetic processing device.

BACKGROUND

A GPU (Graphic Processing Unit) used as an arithmetic processing device is originally a processor for image processing. However, the GPU is often used as a processor for machine learning since the GPU has a number of floating point multiply-add arithmetic circuits to be described later and is optimized for a matrix calculation. In addition, the GPU is generally used for a large amount of matrix calculation in deep learning.

In many cases, the deep learning uses a neural network to perform a processing. For example, the deep learning for image recognition includes two processes, that is, a forward process for determining what is a given image and a backward process for updating parameters of a neural network for determination. An arithmetic processing device for the deep learning uses a difference between a calculation result in the forward process and an expected value to perform the backward process so as to update the parameters of the neural network. Then, the arithmetic processing device uses the updated parameters to improve the accuracy of the forward process.

The neural network is composed of plural layers and an arithmetic processing such as a feature amount extraction is performed and learning is repeated in each layer. In this way, the neural network has a multilayer structure in which a different arithmetic processing is performed in each layer. With such a multilayer structure, in order to update the parameters for each layer, a difference between a calculation result of the subsequent layer and an expected value is obtained, and the learning is performed while propagating the difference to a preceding layer and propagating a result of difference calculation in the preceding layer to a layer previous to the preceding layer. The terms "preceding" and "previous" used herein are based on a direction in which the forward process proceeds.

An arithmetic processing mainly used for image recognition in the deep learning may include a process called a convolution neural network in which an operation called convolution (hereinafter, referred to as "convolution operation") is frequently used. For example, for image recognition, a weighting frame having predetermined parameters as elements in a region on an input image is disposed in the original image. Then, the results of multiplication of each element of the input image on which the weighting frame is disposed and each element of the weighting frame are added up to calculate the feature amount of the region on the input image in which the weighting frame is disposed. The integration of feature amounts calculated by performing the disposition of the weighting frame on the original image for the entire input image using the movement width of the predetermined weighting frame becomes an output image output as the result of the convolution operation. The weighting frame is e sometimes called a "filter".

For example, an image having 8×8 elements, that is, an 8×8 bit grayscale image (hereinafter, referred to as an 8×8 input image), is considered as an input image. Further, descriptions will be made of a case where a filter having 4×4 elements (hereinafter, referred to as a 4×4 filer) is used and is shifted column by column or row by row in the input image. In the following description, the direction in which a row extends is referred to as a "row direction" and a direction in which a column extends is referred to as a "column direction". In this case, when a 4×4 filter arranged at one end in the row direction of the 8×8 input image is moved 5 (=8-3) times in the row direction, the 4×4 filter reaches the other end. That is, the output image has five elements in the row direction. Similarly, when a 4×4 filter arranged at one end in the column direction of the 8×8 input image is moved 5 (=8-3) times in the column direction, the 4×4 filter reaches the other end. That is, the output image has five elements in the column direction as well. Therefore, the output image becomes a 5×5 image. Each element of the output image has a total value obtained by multiplying each element of the filter arranged on the input image and each element of the input image at a position corresponding to each element.

In a case of performing an operation for summing such multiplied values, an arithmetic processing device often uses an instruction (command) called fma (Fused Multiply Add). The fma is an instruction that performs a floating point multiply-add operation represented by $(A \times B)+C$.

Further, when performing such a convolution operation, a method called SIMD (Single Instruction Multiple Data) is used in which one instruction is executed to simultaneously perform an arithmetic processing on plural pieces of data and obtain plural operation result outputs at the same time. For example, an operation using SIMD for processing four pieces of data in parallel will be described. In the following description, the SIMD that processes n pieces of data in parallel is called nSIMD. That is, the arithmetic processing in this case may be said to be 4SIMD arithmetic processing. In the following description, the operation using SIMD is referred to as a SIMD operation.

In the case of convolution operation using the 8×8 input image and the 4×4 filter described above, the arithmetic processing device may calculate four values at a time, which are obtained by multiplying one element of the filter in each disposition state in which the filter is shifted four times in one row, by a corresponding element of the input image. That is, when performing the 4SIMD operation, the arithmetic processing device may calculate elements of the output image corresponding to the state of the filters of four different arrangements in parallel.

In the case of performing such an arithmetic processing using SIMD, the arithmetic processing device stores data to be used for arithmetic operation out of data of the input image stored in a memory as a storage device, in a register used for the SIMD operation, and then performs one arithmetic operation. By repeating this processing, the arithmetic processing device may perform a convolution operation. For example, in the case of a 4SIMD arithmetic processing, four registers are used for one SIMD arithmetic operation. When storing data in registers in the SIMD operation, the arithmetic processing device uses a SIMD load instruction to store data in all the registers of the SIMD register at a time.

Here, in the convolution operation, each element of the filter and a corresponding element of the input image are used to obtain one element of the output image. Further, in the convolution operation using SIMD, since the iterative operation is performed while shifting the range of the filter, the same data is used many times in the concurrent convolution operation.

In a convolution operation in the related art, the multiplication of elements and the sum of multiplication results are collectively performed for each disposition state of one filter. Therefore, when a parallel calculation is performed in plural arithmetic circuits as in the case of using SIMD, in order to improve the processing speed, it is necessary to adjust the calculation order to avoid using the same data or to prepare and use the copying of the same data at the same time.

As a technique of the convolution operation, there is a conventional technique of a semiconductor integrated circuit in which the ranges of data lines accessible by adjacent arithmetic circuits overlap with each other. Further, as a technique for parallel processing of operations, there is a conventional technique of performing an arithmetic operation by using data expressions in which intermediate outputs of operation elements are multiplexed.

However, when adjusting the calculation order in order to avoid reading of the same data, a multiplication or a division is used to determine data to be used. Since the multiplication or the division is high in costs since they consume a large number of cycles by the arithmetic operation, as compared with an addition or a subtraction. In addition, during the arithmetic operation of the multiplication or division, there is a possibility that an arithmetic circuit may not operate every cycle. For this reason, adjusting the calculation order may lower the processing speed of the arithmetic operation. In addition, when preparing the copy of data in order to avoid reading of the same data, there is a possibility that rearrangement of data which is not used at the same time becomes complicated and the number of data to be copied increases. For example, when a single movement distance of the filter is two rows and two columns or more, the above-described problem arises because the data to be read is broken into each arithmetic circuit. That is, in the case of using a processing method which performs arithmetic operations collectively for each filter arrangement state, there is a possibility that high calculation cost may be incurred to improve the processing speed.

In addition, even when different data is used, depending on a method of moving data to a register, the data may not be read from the register. For example, when two arithmetic circuits attempt to read data from the same register at the same timing, it may be difficult to read the data. Therefore, there is a possibility that the processing speed of the arithmetic operation may be lowered.

In particular, in the forward operation, when plural arithmetic circuits are used, it is difficult to input appropriate data in order to avoid conflicts between the arithmetic circuits, which makes it difficult to improve the arithmetic processing speed.

Further, even when a semiconductor integrated circuit in which the ranges of data lines accessible by adjacent arithmetic circuits overlap with each other is used, it is difficult to suppress occurrence of conflicts between two or more arithmetic circuits. Furthermore, even with the conventional technique using data expressions in which intermediate outputs are multiplexed, there is a high possibility that conflicts in data input autobiography may be caused, which makes it difficult to improve the arithmetic processing speed.

Related techniques are disclosed in, for example, Japanese Laid-Open Patent Publication Nos. 07-282237 and 2005-346470.

SUMMARY

According to an aspect of the embodiments, an arithmetic processing device which overlaps second data having second element data included in a matrix on first data having first element data included in the matrix such that the first element data and the second element data are associated with each other, moves the second data in a row direction by a predetermined number of the first element data to perform a predetermined operation, and calculates third data having a matrix including third element data calculated by the predetermined operation in each state of overlapping of the second data on the first data, the arithmetic processing device includes, a memory that stores the first data and the second data, a plurality of arithmetic circuits, a first memory arranged for each of the arithmetic circuits and that stores a first predetermined row having the predetermined number of the first data stored in the memory, a second memory arranged for each of the arithmetic circuits and that stores a second predetermined row having a predetermined number of the second data stored in the memory, and a plurality of multiply-add arithmetic circuits arranged for each of the arithmetic circuits, a number of the multiply-add arithmetic circuits corresponding to the predetermined number, each of the multiply-add arithmetic circuits performs a processing of acquiring different first element data included in the first predetermined row from the first memory, acquiring the same second element data included in the second predetermined row from the second memory, and performing an operation using the acquired first element data and the acquired second element data a predetermined number of times, to obtain the third data by executing the operation using the first data and the second data based on a result of performing a row operation which is an operation of one row of the first data.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIGS. 11A to 11C are views for explaining the details of reading and storage of data by the multiply-add arithmetic circuit;

DESCRIPTION OF EMBODIMENTS

Embodiments of an arithmetic processing device and a control method of the arithmetic processing device disclosed in the present disclosure will be described in detail below with reference to the accompanying drawings. It is to be noted, however, that the arithmetic processing device and the control method of the arithmetic processing device disclosed in the present disclosure are not limited by the following embodiments.

First Embodiment

Figure 1:
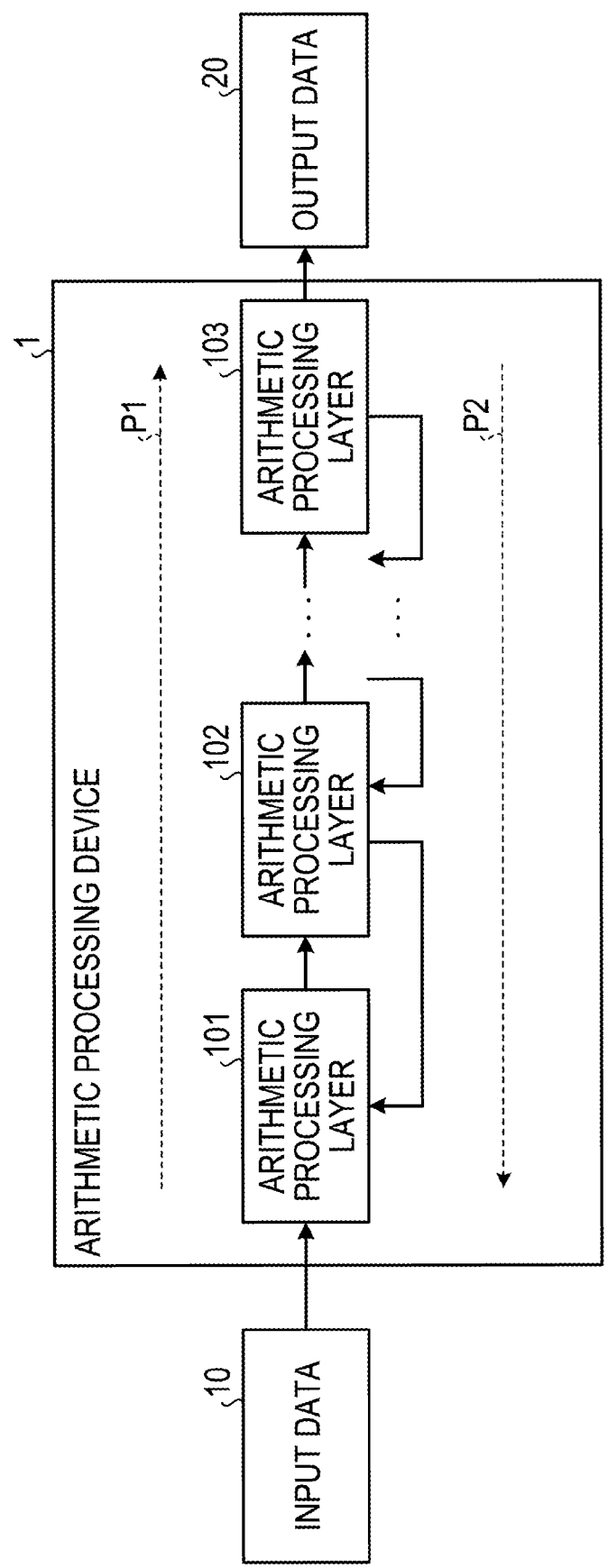
FIG. 1 is a view for explaining an overall flow of deep learning.

FIG. 1 is a view for explaining an overall flow of deep learning. A first embodiment addresses deep learning for image recognition. In the following description, a convolution operation will be described as an example, but operations performed in each layer of a neural network may include operations other than the convolution operation.

Referring to FIG. 1, an arithmetic processing device 1 receives input data 10 and has plural arithmetic processing layers in which a different arithmetic processing such as an extraction of different features is performed. The arithmetic processing device 1 uses weighting data to execute a convolution operation on the acquired input data 10 in the first arithmetic processing layer 101. Here, the weighting data corresponds to a filter. Next, the arithmetic processing device 1 uses weighting data to perform a convolution operation on output data 20, which is a feature amount obtained from the first arithmetic processing layer 101, in a second arithmetic processing layer 102. While sequentially performing the arithmetic processing in the respective layers in this way, the arithmetic processing device 1 outputs a result of the convolution operation using the weighting data in an n-th arithmetic processing layer 103 (i.e., feature amount), as the output data 20. In this manner, for example, assuming that the input data 10 is an input image, the output data 20 in each layer may be acquired as a feature amount for image recognition. Then, by performing the deep learning for updating the parameters repetitively using the feature amount acquired in each layer, the arithmetic processing device 1 may recognize the image with the improved accuracy of image recognition. Further, for example, the input data 10 is voice data for voice recognition and the input data 10 is a word for text mining. In the following description, the arithmetic processing by the convolution operation in a direction toward an arrow P1 by the arithmetic processing device 1 may be sometimes called a "convolution forward operation".

Further, the arithmetic processing device 1 uses an expected value difference to change the weighting data in order to increase the accuracy of extraction of the feature in each layer. For example, the arithmetic processing device 1 has a predetermined expected value and compares it with the output data 20 from the n-th arithmetic processing layer 103. Then, the arithmetic processing device 1 obtains a difference between the output data 20 and the expected value and obtains a difference between the weighting data and the expected value using the obtained difference and the input data from the (n−1)-th layer. Further, the arithmetic processing device 1 uses the obtained difference between the weighting data and the expected value to correct the weighting data. Then, the arithmetic processing device 1 uses the corrected weighting data and the difference between the output data 20 and the expected value to obtain top difference data which is data for correcting the weighting data in the (n−1)-th layer. Next, the arithmetic processing device 1 uses a difference between the obtained output data 20 of the (n−1)-th layer and the expected value of the output at the (n−1)-th layer to correct the weighting data of the (n−1)-th layer for the input data from the (n−2)-th layer.

Here, assuming that the direction of the arrow P1 is the arrangement direction of each layer, the arithmetic processing device 1 calculates top difference data in a specific arithmetic processing layer for an arithmetic processing layer preceding the specific arithmetic processing layer. Then, the arithmetic processing device 1 uses the calculated top difference data in the specific arithmetic processing layer and the output data 20 from the preceding arithmetic processing device 1 to obtain a difference between the weighting data and the expected value in the specific arithmetic processing layer. Further, the arithmetic processing device 1 uses the obtained difference between the weighting data and the expected value in the specific arithmetic processing layer to correct the weighting data. Thereafter, the arithmetic processing device 1 uses the corrected weighting data in the specific arithmetic processing layer and the difference between the output data 20 and the expected value in the specific arithmetic processing layer to calculate top difference data in a layer preceding the specific arithmetic processing layer.

The arithmetic processing device 1 sequentially repeats the correction of the weighting data in each arithmetic processing layer and the calculation of the top difference data in the preceding arithmetic processing layer. As a result, the arithmetic processing device 1 may correct the weighting data of all the arithmetic processing layers 101 to 103 in accordance with the expected value of the output data 20 of the arithmetic processing layer 103. In the following description, the arithmetic processing for correcting the weighting data in each arithmetic processing layer in a direction toward an arrow P2 by the arithmetic processing device 1 may be sometimes called a "convolution backward operation".

Hereinafter, input data in a specific arithmetic processing layer is referred to as "bottom data". The bottom data corresponds to the output data 20 from an arithmetic processing layer preceding the specific arithmetic processing layer. Further, the data of a difference between the weighting data and an expected value in the specific arithmetic processing layer is referred to as "weighting difference data". Further, the data of a calculation result of the convolution backward operation in a specific arithmetic processing device is referred to as "bottom difference data". Further, the original data used for correction of the weighting data in the convolution backward operation in the specific arithmetic processing layer is referred to as "top difference data". Here, the calculation result of the convolution backward operation in the specific arithmetic processing layer is used as the original data of the convolution backward operation of an arithmetic processing layer preceding the specific arithmetic processing layer. That is, the bottom difference data calculated in the specific arithmetic processing layer corresponds to top difference data of an arithmetic processing layer preceding the specific arithmetic processing layer.

Further, in the convolution backward operation, the calculation of obtaining the weighting difference data using the top difference data and the bottom data is referred to as "convolution backward weighting difference operation". Furthermore, the calculation of calculating the bottom difference data using the corrected weighting data and the top difference data is referred to as "convolution backward bottom difference operation".

In the present embodiment, descriptions will be made of a case where the bottom data and the weighting data are arranged in a rectangular matrix as element data. Therefore, in the following description, the number of rows and the number of columns of the weighting data are referred to as a "kernel number", or a "kernel size", which is the unit corresponding to the number of kernels. The kernel number is an example of "predetermined number". However, each of the bottom data and the weighting data may be a rectangle. Further, the amount of one movement of the weighting data in the convolution forward operation may be sometimes referred to as a "stride number".

Figure 2:
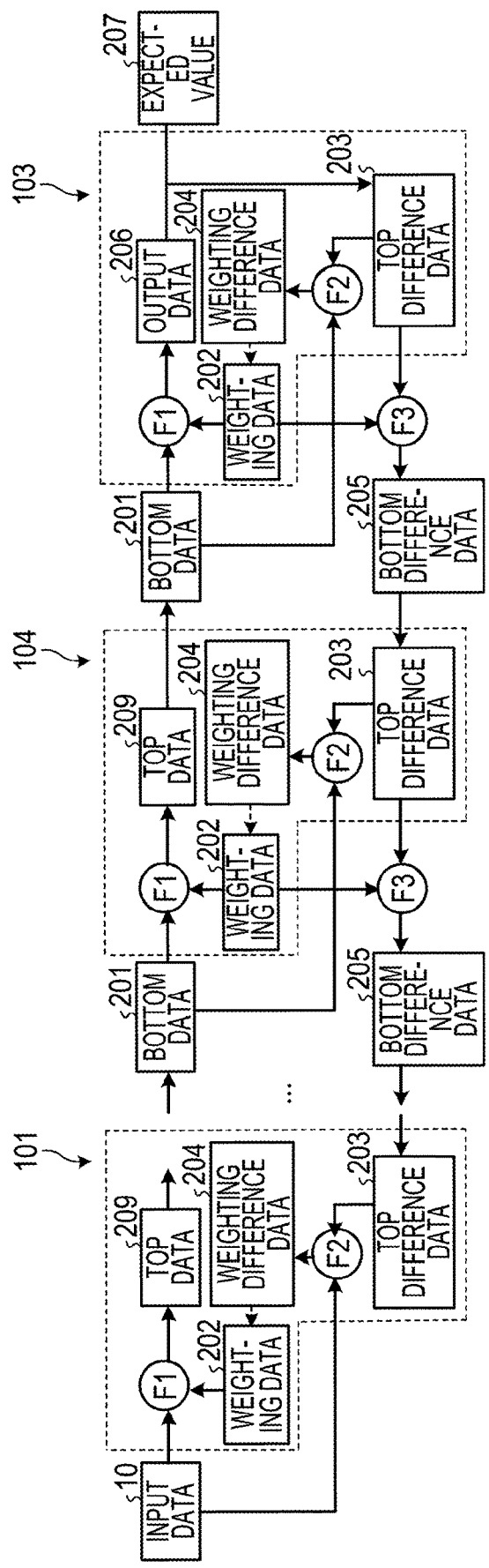
FIG. 2 is a view for explaining a convolution forward operation and a convolution backward operation.

FIG. 2 is a view for explaining the convolution forward operation and the convolution backward operation. Referring to FIG. 2, top difference data 203 is generated from output data 206 and an expected value 207 from a first layer at which an arithmetic processing is started using the input data 10. It is here assumed that an arithmetic processing layer 101 is the first layer, an arithmetic processing layer 104 is the (n−1)-th layer, and an arithmetic processing layer 103 is the n-th layer. The calculation in each of the arithmetic processing layers 101 to 104 up to the n-th layer is described as an example. The processing described by circles in FIG. 2 represents an arithmetic processing. An arithmetic processing F1 represents the convolution forward operation. An arithmetic processing F2 represents the convolution backward weighting difference operation. An arithmetic processing F3 represents the convolution backward bottom difference operation.

In the first layer, the arithmetic processing device 1 performs the convolution forward operation represented by the arithmetic processing F1 on the input data 10 and the weighting data 202 in the first layer and calculates the top data 209 as the operation result. The input data 10 and the bottom data 201 are handled in the same way in the convolution forward operation, which are hereinafter collectively referred to as the bottom data 201. Thereafter, although not illustrated, similarly, in the second layer, the arithmetic processing device 1 performs the convolution forward operation represented by the arithmetic processing F on the top data 10 of the previous layer and the weighting data 202 in the second layer. In the last n-th layer, the arithmetic processing device 1 repeats the convolution forward operation represented by the arithmetic operation F1 on the top data 209 of the previous layer and the weighting data 202 of the n-th layer. However, in the last n-th layer, the arithmetic processing device 1 further calculates the top difference data 203 by comparing the output data 206 with the expected value 207. Here, the input data 10 of the first layer corresponds to the bottom data 201 of the second to n-th layers. The output data 20 of the n-th layer corresponds to the top data 209 which is the result of operation in the first to (n−1)-th layers.

Further, in continuation of the backward operation, the arithmetic processing device 1 performs the convolution backward weighting difference operation represented by the arithmetic processing F2 on the top difference data 203 and the bottom data 201 to calculate the weighting difference data 204. Further, the arithmetic processing device 1 uses the weighting difference data 204 to update the weighting data 202. Here, an arrow indicated by a dashed chain line in FIG. 2 represents the process of updating the weighting data 202. More specifically, the arithmetic processing device 1 multiplies the weighting difference data 204 by a learning rate to calculate new weighting data 202.

Further, the arithmetic processing device 1 performs the convolution backward bottom difference operation represented by the arithmetic operation F3 on the weighting data 202 and the top difference data 203 used in the forward operation to calculate the bottom difference data 205.

Here, in FIG. 2, the arithmetic processing layer 103 which is the last layer is illustrated as an example, but the same operation is performed in the other layers as well. However, in the other layers, the arithmetic processing device 1 uses the bottom difference data 205 calculated in the next layer as the top difference data 203.

Figure 3:
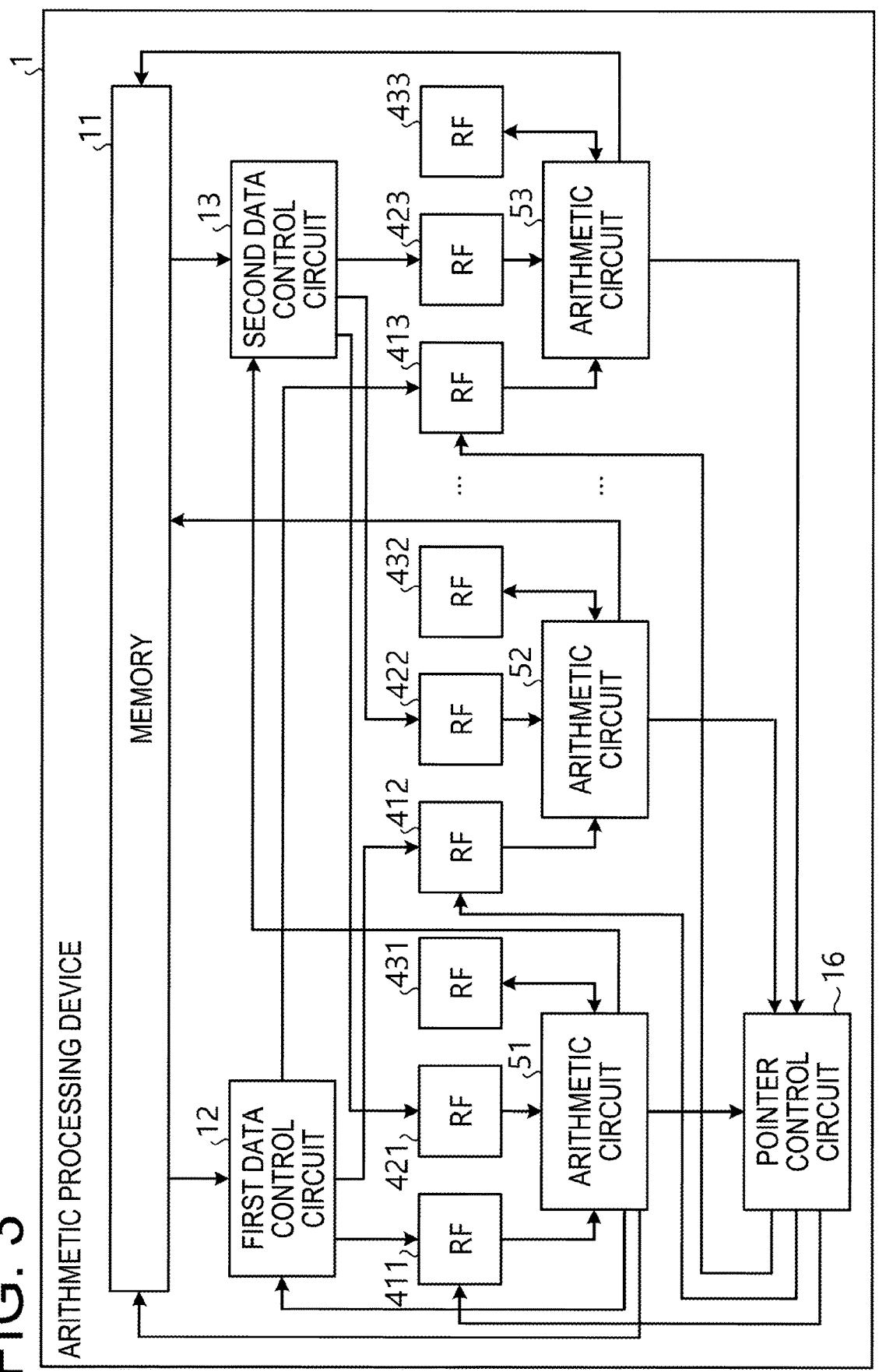
FIG. 3 is a block diagram of an arithmetic processing device.

Next, the details of the arithmetic processing device 1 will be described with reference to FIG. 3. FIG. 3 is a block diagram of an arithmetic processing device. Referring to FIG. 3, the arithmetic processing device 1 includes a memory 11, a first data control circuit 12, a second data control circuit 13, register files (RFs) 411 to 413, 421 to 423, and 431 to 433. Further, the arithmetic processing device 1 includes arithmetic circuits 51 to 53 and a pointer control circuit 16.

Here, the register files 411 to 413 have the same function. Therefore, hereinafter, the register files 411 to 413 are referred to as a "register file 410" when they are not distinguished from each other. In addition, the register files 421 to 423 have the same function. Therefore, hereinafter, the register files 421 to 423 are referred to as a "register file 420" when they are not distinguished from each other. Further, the register files 431 to 433 have the same function. Therefore, hereinafter, the register files 431 to 433 are referred to as a "register file 430" when they are not distinguished from each other. Further, the arithmetic circuits 51 to 53 have the same function. Therefore, hereinafter, the arithmetic circuits 51 to 53 are referred to as an "arithmetic circuit 50" when they are not distinguished from each other.

The memory 11 is a memory for storing various data to be used for calculation. For example, the memory 11 stores the bottom data 201 and the weighting data 202. This memory 11 corresponds to an example of a "data memory".

Here, the top data which is an output value of the arithmetic processing will be described. A value obtained by dividing a value obtained by subtracting the weighting data 202 from the number of columns of the bottom data 201 by a stride number becomes the number of columns of the top data 209 which is an output value of the operation result. In the following description, the number of columns of top data is referred to as a "top size". Further, when the bottom data 201 and the weighting data 202 have a square matrix, the top data also has a square matrix, in which case the number of rows of top data is also equal to the top size. For example, in a case where the bottom data 201 has a 5×5 matrix and the weighting data 202 has a 3×3 matrix, when the stride number is 1, the top size is 3. In the same case, when the stride number is 2, the top size is 2.

The register files 410, 420, and 430 are memories that temporarily store data to be used for calculation. In the present embodiment, the register files 410, 420, and 430 are allocated to the respective arithmetic circuits 50.

The register file 410 stores element data of the bottom data 201 to be used in the convolution forward operation. The register file 420 also stores the weighting data 202 to be used in the convolution forward operation. Further, the register file 430 stores the top data 209 which is the operation result in the convolution forward operation or an intermediate value of the operation. This register file 410 corresponds to an example of a "first memory". The register file 420 corresponds to an example of a "second memory".

When the convolution forward operation is executed, the first data control circuit 12 reads the element data of the bottom data 201 from the memory 11 by a predetermined number of rows at a time and stores the read element data of the bottom data 201 in the register file 410 corresponding to each arithmetic circuit 50. Specifically, the first data control circuit 12 reads the element data of the bottom data 201 according to the following procedure.

The first data control circuit 12 reads, from the memory 11, the element data of the bottom data 201 from the head position in a row at which reading of the bottom data 201 is to be started, up to the number of the register file 410 arranged for each row of the stride number. That is, the first data control circuit 12 reads, from the memory 11, the element data of the number that corresponds to the stride number corresponding to the number of arithmetic circuits 50. Then, the first data control circuit 12 stores the read element data of the number corresponding to the stride number in each register file 410 corresponding to each arithmetic circuit 50. Here, the register file 410 has an array corresponding to one row of the bottom data 201, and one element data is read out for each array. Therefore, the first data control circuit 12 stores the element data in the register file 410 so that data of one row is stored in different arrays. In addition, the first data control circuit 12 stores the element data so that the element data of the same column of the bottom data 201 is stored in the same array.

Here, when performing the convolution forward operation, the weighting data 202 is moved by the stride number in the row direction from the position of the first row and the first column of the weighting data 202 to the position of the first row and the first column of the bottom data 201. In the following description, when the operation is performed using two rows, a position at which one row and one column of the two rows coincide with each other is referred to as an initial position. Then, the weighting data 202 is moved in the row direction from the initial position of the bottom data 201 by the stride number up to a number obtained by adding an integer multiple of the stride number to the kernel number, which is an integer multiple number which is larger than the number of rows of the bottom data 201 and becomes the minimum number. In the following description, a number obtained by adding the integer multiple of the stride number to the kernel number, which is an integer multiple number which is larger than the number of rows of the bottom data 201 and becomes the minimum number, is referred to as a "maximum movement number".

The first data control circuit 12 repeats the reading of the element data of the bottom data 201 by the number of rows corresponding to the stride number and the storage of the element data in the register file 410 by times corresponding to the number of register files 410. However, when the number of register files 410 is equal to or larger than the maximum movement number, the first data control circuit 12 stops the reading of the element data and the storage of the element data in the register file 410 when performing the operation by times corresponding to the maximum movement number.

Next, after the operation using the element data stored in the register file 410 is completed, the first data control circuit 12 specifies the head position which is moved in the column direction by the stride number from the head position of the previous reading. Then, the first data control circuit 12 reads, from the memory 11, the element data of the bottom data 201 from the specified head position by the number of rows corresponding to the stride number and stores the read element data in the register file 410. The first data control circuit 12 repeats the reading of the element data of the bottom data 201 by the number of rows corresponding to the stride number and the storage of the element data in the register file 410 by times corresponding to the maximum movement number.

When the reading of the element data of the bottom data 201 by the number of rows corresponding to the stride number and the storage of the element data in the register file 410 by times corresponding to the maximum movement number are not completed by times corresponding to the maximum movement number, the first data control circuit 12 repeats the same processing until the times corresponding to the maximum movement number is reached. That is, after completing the operation when the head position is shifted in the column direction by the times corresponding to the maximum movement number, the first data control circuit 12 terminates the reading and storage of the element data.

When the convolution forward operation is executed, the second data control circuit 13 reads the element data of the weighting data 202 from the memory 11 by a predetermined number of rows and stores the read element data in the register file 420 corresponding to each arithmetic circuit 50. Specifically, the second data control circuit 13 reads the element data of the weighting data 202 according to the following procedure.

The second data control circuit 13 reads, from the memory 11, the element data of the weighting data 202 of the number of rows corresponding to the stride number from the head position in a row at which reading of the weighting data 202 is to be started. Then, the second data control circuit 13 stores the read element data in the register file 420 corresponding to each arithmetic circuit 50. That is, the second data control circuit 13 stores the same element data in all of the register files 420 corresponding to each arithmetic circuit 50.

After the operation using the element data stored in the register file 420 is completed, the second data control circuit 13 specifies the head position which is moved in the column direction by the stride number from the previous head position. Then, the second data control circuit 13 reads, from the memory 11, the element data of the weighting data 202 from the specified head position by the number of rows corresponding to the stride number and stores the read element data in the register file 420. The second data control circuit 13 repeats the reading of the element data of the weighting data 202 by the number of rows corresponding to the stride number and the storage of the element data in the register file 410 while moving the head position.

When the arithmetic processing is not completed at the point of time when the reading of the element data and the storage of the element data in the register file 420 are performed by the times corresponding to the maximum movement number, the second data control circuit 13 repeats the same processing until the arithmetic processing is completed.

Figure 4:
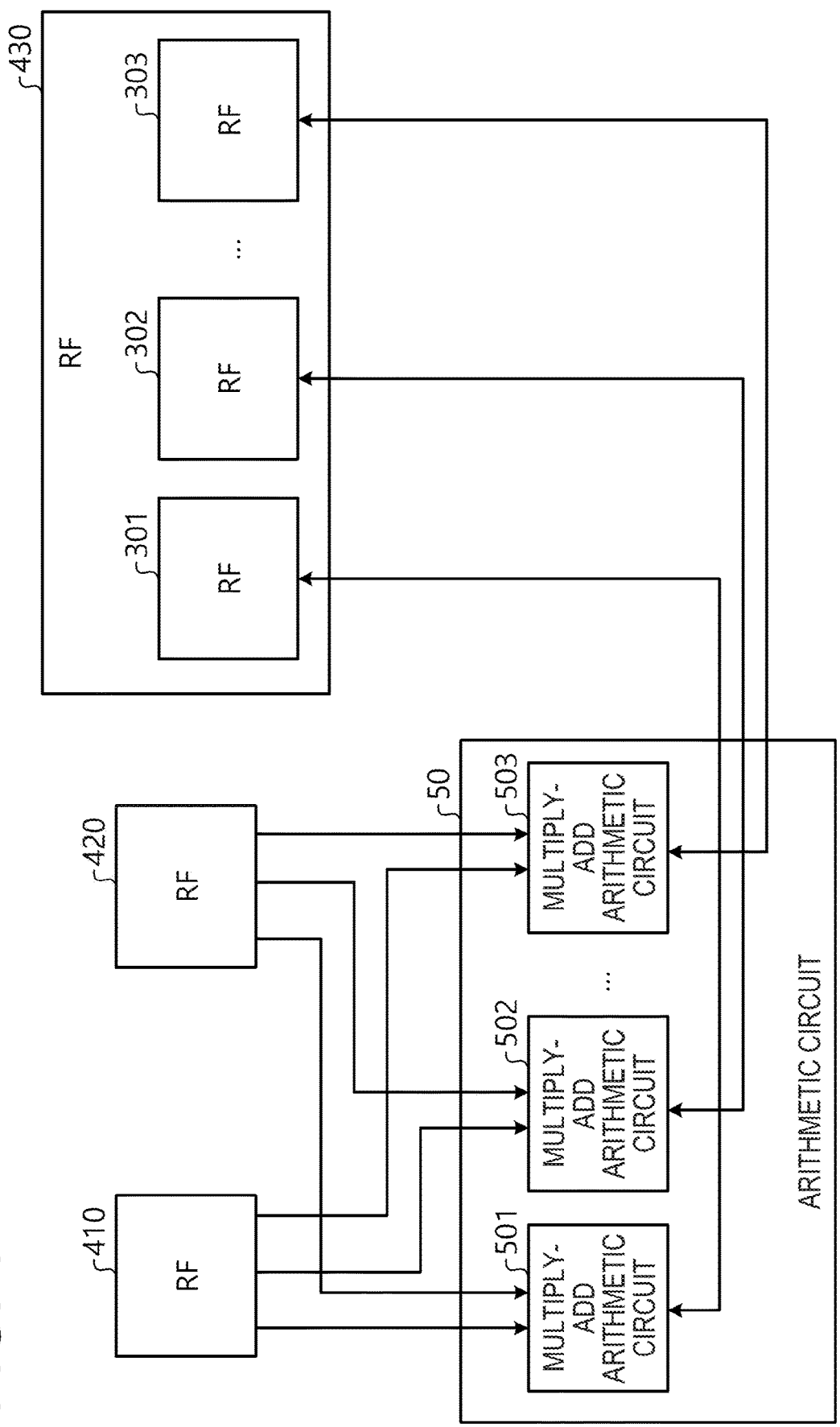
FIG. 4 is a block diagram illustrating details of an arithmetic circuit.

The arithmetic circuit 50 uses the element data stored in the register files 410 and 420 to execute the convolution forward operation, the convolution backward weighting difference operation, and the convolution backward bottom difference operation, and stores the operation result in the register file 430. FIG. 4 is a block diagram illustrating details of the arithmetic circuit.

As illustrated in FIG. 4, the arithmetic circuit 50 includes multiply-add arithmetic circuits 501 to 503 arranged in parallel to perform an FMA arithmetic operation. The multiply-add arithmetic circuits 501 to 503 form different calculation paths. The arithmetic circuit 50 may change the number of multiply-add arithmetic circuits 501 to 503 to be used in accordance with the operation to be performed. Further, the register file 430 includes register files 301 to 303 corresponding to the multiply-add arithmetic circuits 501 to 503, respectively. Details of the convolution forward operation by the arithmetic circuit 50 will be described below.

The arithmetic circuit 50 prepares the number of top sizes. In addition, each arithmetic circuit 50 uses the multiply-add arithmetic circuits 501 to 503 of the number obtained by multiplying the top size by a stride number to perform the following arithmetic operation. The multiply-add arithmetic circuit 503 is a multiply-add arithmetic circuit of a number obtained by multiplying the top size by the stride number.

The arithmetic circuit 50 receives, from the pointer control circuit 16, a designation of position of the head pointer arranged in the element data included in a row corresponding to the stride number of the bottom data 201 stored in the register file 410. More specifically, the arithmetic circuit 50 receives, from the pointer control circuit 16, the input of position of the head pointer which designates the head element data of a row of the bottom data 201 stored in the register file 410. Thereafter, each time calculation of one multiply-add operation is performed, the arithmetic circuit 50 sequentially receives, from the pointer control circuit 16, the input of position of the head pointer which designates the element data advancing by the stride number of the row of the bottom data 201 stored in the register file 410. The arithmetic circuit 50 receives, from the pointer control circuit 16, the input of position of the updated head pointer until the head pointer reaches the last position which does not exceed the element data before the kernel number from the last element data of the row.

Each of the multiply-add arithmetic circuits 501 to 503 of the arithmetic circuit 50 reads the element data of a number obtained by multiplying the top size by the stride number, from the designated position of the head pointer in the bottom data 201, one by one from the head.

Further, the multiply-add arithmetic circuits 501 to 503 of the arithmetic circuit 50 read the element data of a number corresponding to the stride number from the head of one column of the weighting data 202 stored in the register file 420. Then, the multiply-add arithmetic circuit 501 associates the element data of the read bottom data 201 and the element data of the weighting data 202 in the order from the head to multiply the associated element data of the read bottom data 201 by the associated element data of the weighting data 202. Further, the arithmetic circuit 50 sums the multiplication results. In the following description, the operation of multiplying the corresponding element data in the convolution forward operation and summing up the multiplication results is referred to as a "forward multiply-add operation". Then, the arithmetic circuit 50 stores the operation results totaled at the position of the head pointer designated by the pointer control circuit 16 in the register file 430. Then, the arithmetic circuit 50 notifies the pointer control circuit 16 of completion of one forward multiply-add operation.

Next, the multiply-add arithmetic circuits 501 to 503 receive a designation of the position of the head pointer that is advanced by the stride number from the previous position of the element data of the bottom data 201 stored in the register file 410. Then, the multiply-add arithmetic circuits 501 to 503 of the arithmetic circuit 50 read the element data of the number obtained by multiplying the top size by the stride number, from the designated position of the head pointer in the bottom data 201, one by one from the head. Here, when there is no data to be read in the multiply-add arithmetic circuits 501 to 503, 0 is read.

Further, the multiply-add arithmetic circuits 501 to 503 read the element data of a number corresponding to the stride number from the position which advances by the stride number in the column direction from the head of one column of the weighting data 202 stored in the register file 420. Then, the multiply-add arithmetic circuits 501 to 503 associate the read element data of the bottom data 201 and the element data of the weighting data 202 in the order from the head to multiply the associated element data of the bottom data 201 by the associated element data of the weighting data 202. Further, the multiply-add arithmetic circuits 501 to 503 sum the multiplication results. Then, the arithmetic circuit 50 stores the operation results totaled at the position of the head pointer designated by the pointer control circuit 16 in the register file 430. Then, the arithmetic circuit 50 notifies the pointer control circuit 16 of completion of one forward multiply-add operation.

The multiply-add arithmetic circuits 501 to 503 repeat the reading of the element data of the bottom data 201 and the weighting data 202, and the forward multiply-add operation until the operation of one row of the bottom data 201 is completed. After the operation of one row of the bottom data 201 is completed, when the calculation of rows corresponding to a kernel size has not been completed, the multiply-add arithmetic circuits 501 to 503 receive a position designation of the pointer indicating the head of the next row from the pointer control circuit 16. Then, the multiply-add arithmetic circuits 501 to 503 perform the reading of the element data of the bottom data 201 and the weighting data 202, and the forward multiply-add operation on the next row.

When the calculation of rows corresponding to the kernel size has been completed, the multiply-add arithmetic circuits 501 to 503 add the calculation results for rows corresponding to the stride number, which are calculation results between the multiply-add arithmetic circuits by the stride number from the head. As a result, the multiply-add arithmetic circuits 501 to 503 calculate the element data of one row of the top data 209 that may be calculated by moving the weighting data 202 forward from the left end to the right end of the bottom data 201 in the column direction by the stride number. The arithmetic circuit 50 stores the calculation results in the memory 11.

Further, in the case of the arithmetic processing layer 103 which is the final n-th layer in FIG. 1, the arithmetic circuit 50 outputs the top data 209 to an output device (not illustrated) such as a monitor to provide the calculation results to a user. For example, in the case of image recognition, the arithmetic circuit 50 outputs the recognition result to the output device.

When the convolution forward operation is executed, the pointer control circuit 16 designates the head pointer in the register file 410. For example, the pointer control circuit 16 first sets the head pointer in the register file 410 at the head of the register file 410.

The pointer control circuit 16 sets the head pointer in the register file 410 to a position which is moved by the stride number each time the pointer control circuit 16 receives a notification of completion of one calculation. When the movement of the head pointer in the register file 410 is performed by the maximum movement number, the pointer control circuit 16 sets the head pointer to the head of the register file 410. That is, the head pointer in the register file 410 is set at the head of a row of the next stride number in the bottom data 201. The pointer control circuit 16 repeats the same process until the convolution forward operation by the arithmetic circuit 50 is completed.

The convolution forward operation performed by the arithmetic processing device 1 according to the present embodiment will be described in detail below.

Figure 5:
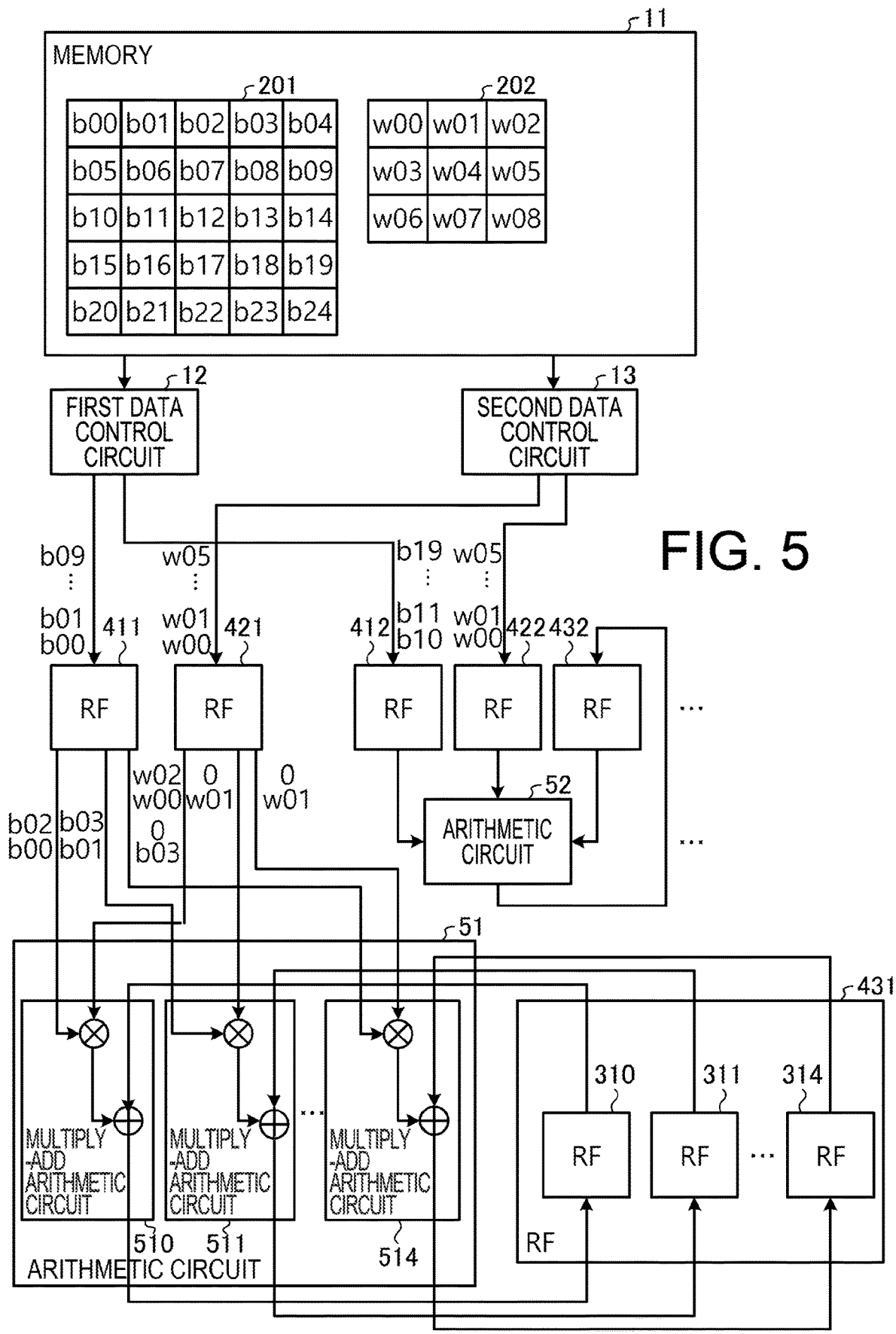
FIG. 5 is a view illustrating an overall flow of data handling at the time of convolution forward operation.

First, data handling from storage to operation of data will be described with reference to FIG. 5. FIG. 5 is a view illustrating an overall flow of data handling during the convolution forward operation. In FIG. 5, the arithmetic processing device 1 uses the bottom data 201 which includes element data b00 to b24 arranged in a 5×5 matrix and the weighting data 202 which includes element data w00 to w08 arranged in a 3×3 matrix. Further, a case where the stride number is 2 will be described.

FIG. 5 illustrates a first element data storage state after the convolution forward operation is started. In this case, since the top size is 2, two arithmetic circuits 51 and 52 are provided. In addition, since the multiplication result of the top size and the stride number is 4, each of the arithmetic circuits 51 and 52 uses four multiply-add arithmetic circuits 510 to 513 to perform an operation. Here, the multiply-add arithmetic circuits 510 to 513 correspond to the multiply-add arithmetic circuits 501 to 503 in FIG. 4. Further, the register file 431 has four register files 310 to 314 corresponding to the multiply-add arithmetic circuits 510 to 513, respectively. The register files 310 to 314 correspond to the register files 301 to 303 in FIG. 4.

The first data control circuit 12 reads the element data of the rows of the stride number from the start line of the convolution forward operation in the bottom data 201 and stores the read element data in the register file 411. That is, the first data control circuit 12 stores the element data b00 to b09 in the register file 411. In addition, the first data control circuit 12 reads the element data of the rows of the stride number from a row advanced by the stride number from the start line of the convolution forward operation in the bottom data 201 and stores the read element data in the register file 412. That is, the first data control circuit 12 stores the element data b10 to b19 in the register file 412.

The second data control circuit 13 reads the element data of the rows of the stride number from the start line of the convolution forward operation in the weighting data 202 and stores the read element data in the register files 421 and 422. That is, the second data control circuit 13 stores the element data w00 to w05 in the register files 421 and 422.

The arithmetic circuit 51 sequentially reads four pieces of data which are values obtained by multiplying the top size and the stride number from the head of the row stored in the register file 411, into the multiply-add arithmetic circuits 510 to 513, respectively. That is, the multiply-add arithmetic circuit 510 reads the element data b00. In addition, the multiply-add arithmetic circuit 511 reads the element data b01. In addition, the multiply-add arithmetic circuit 512 reads the element data b02. In addition, the multiply-add arithmetic circuit 512 reads the element data b03.

Further, the arithmetic circuit 51 sequentially and repetitively reads the weighting data of the stride number from the head of the row stored in the register file 421, into the multiply-add arithmetic circuits 510 to 513, respectively. Specifically, the arithmetic circuit 51 repeats reading two pieces of element data w00 and w01 of the stride number sequentially into each of the multiply-add arithmetic circuits 510 to 513. That is, the multiply-add arithmetic circuit 510 reads the element data w00. The multiply-add arithmetic circuit 511 reads the element data w01. The multiply-add arithmetic circuit 512 reads the element data w00. The multiply-add arithmetic circuit 513 reads the element data w01.

Then, each of the multiply-add arithmetic circuits 510 to 513 multiplies the read element data. Thereafter, the multiply-add arithmetic circuits 510 to 513 add the multiplication results to the values stored in the corresponding register files 310 to 314 and store the addition result in the register files 310 to 314. Here, 0 is stored as an initial value in the register files 310 to 314.

Next, the multiply-add arithmetic circuits 510 to 513 read the element data of the number of values obtained by multiplying the top size by the stride number from the position of the next head pointer in the bottom data 201. In addition, the multiply-add arithmetic circuits 501 to 513 acquire the element data of the stride number from the position advanced by the stride number from the head in the weighting data 202. Here, the multiply-add arithmetic circuits 501 to 513 read 0 when there is no corresponding element data. Then, the multiply-add arithmetic circuits 501 to 513 repeat the reading of the element data of the bottom data 201 and the weighting data 202 and the forward multiply-add operation. Similarly, the arithmetic circuit 52 also repeats the reading of the element data of the bottom data 201 and the weighting data 202, and the forward multiply-add operation. The handling of element data will be described in more detail below.

Figure 6:
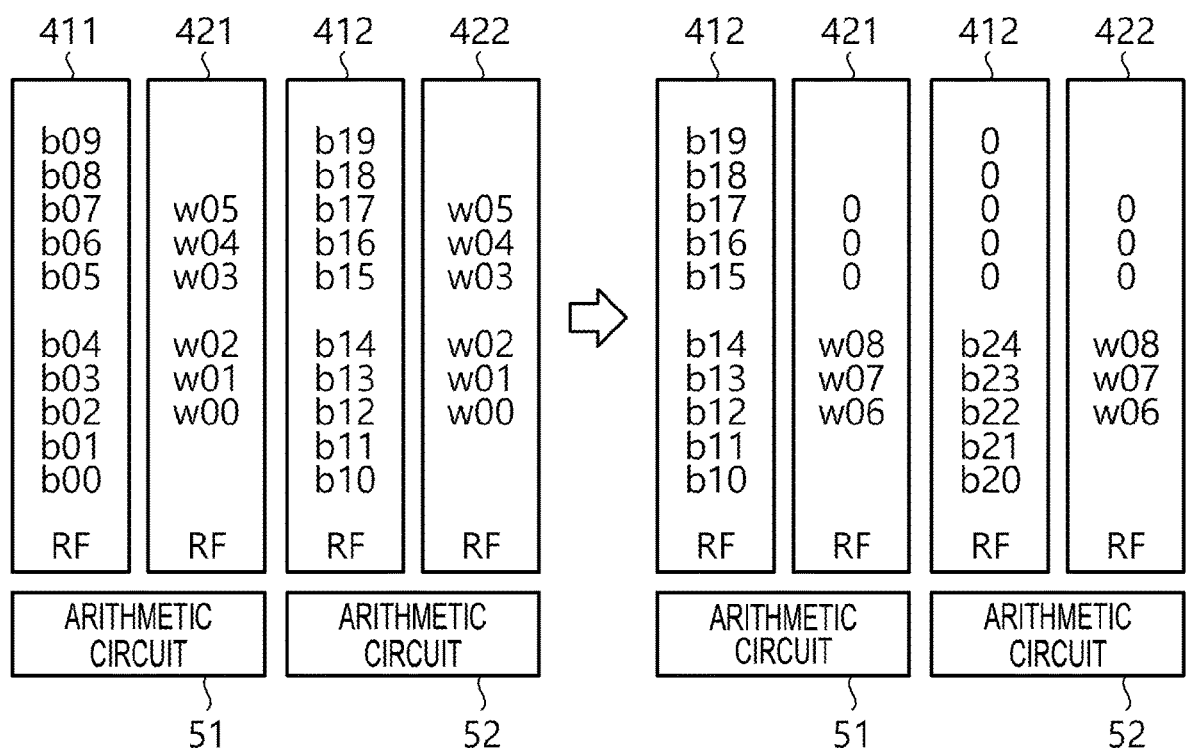
FIG. 6 is a view illustrating transition of stored element data when a stride number in the convolution forward operation is 2.

First, transition of element data stored in the register files 410 and 420 will be described with reference to FIG. 6. FIG. 6 is a view illustrating transition of the stored element data when the stride number in the convolution forward operation is 2.

First, as illustrated in the left side of an arrow in FIG. 6, the element data b00 to b09 are stored in the register file 411. The element data b10 to b19 are stored in the register file 412. The element data w00 to w05 are stored in each of the register files 421 and 422. This state is the same as the state in FIG. 5.

When the calculation of each row is completed, as illustrated in the right side of the arrow in FIG. 6, the element data b10 to b19 are stored in the register file 411. Data of the number of rows corresponding to the stride number from the element data b20 are stored in the register file 412. However, since the bottom data 201 is in the 5×5 matrix, there is no data after the element data b24. Therefore, the element data b20 to b24 are stored in the register file 412. In this case, since element data b25 to b29 do not exist, 0 is stored as a value representing such element data. Data of the number of rows corresponding to the stride number from the element data w06 are stored in the register files 421 and 422. However, since the weighting data 202 is in the 3×3 matrix, there is no data after the element data w08. Therefore, the element data w06 to w08 are stored in the register files 421 and 422. In this case, since element data w09 to w11 do not exist, 0 is stored as a value representing such element data. Here, when the calculation is completed at the completion of the calculation for the number of rows of the kernel size, 0 may not be stored as a value representing the element data b25 to b29 and w09 to w11.

Figure 7:
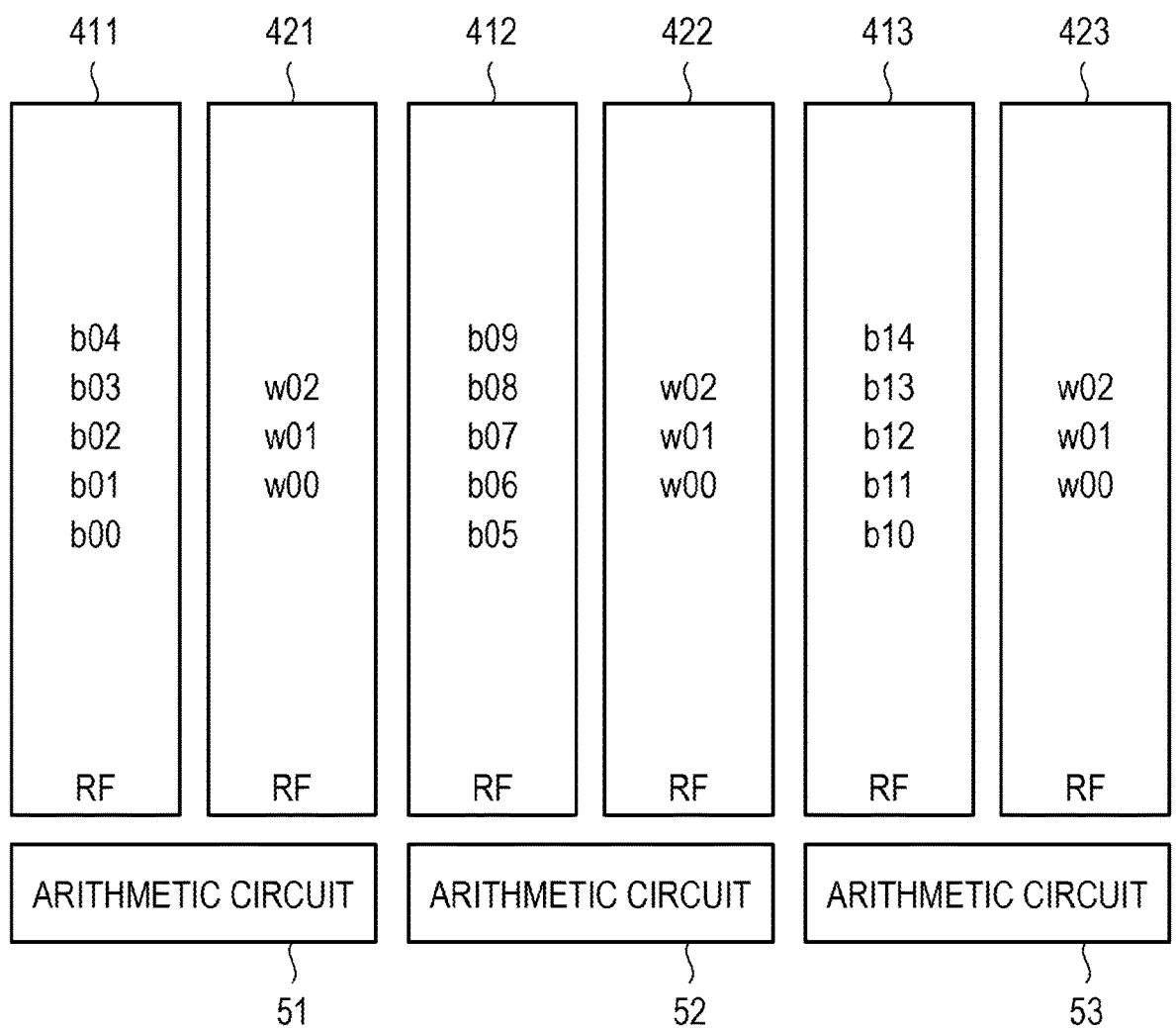
FIG. 7 is a view illustrating an example of a storage state of element data when the stride number in the convolution forward operation is 1.

Similarly, when the stride number using the bottom data 201 having the element data b00 to b24 in the 5×5 matrix and the weighting data 202 having the element data w00 to w08 in the 3×3 matrix is 1, each element data is stored as illustrated in FIG. 7. FIG. 7 is a view illustrating an example of an element data storage state when the stride number in the convolution forward operation is 1. Here, the register files 411 to 413 are three register files and the arithmetic circuits 51 to 53 are three arithmetic circuits.

In this case, the element data b00 to b04 included in the head row of the bottom data 201 are stored in the register file 411. The element data b05 to b09 included in the row next to the row stored in the register file 411 are stored in the register file 412. Further, the element data b10 to b14 of the row next to the row stored in the register file 412 are stored in the register file 413.

The element data w00 to w02 of the head row of the weighting data 202 are stored in each of the register files 421 to 423. Thereafter, every time the operation for one row is completed, it is repeated that the element data of the row shifted in the column direction row by row in the bottom data 201 is stored in the register files 411 to 413. In addition, it is repeated that the element data of the row shifted in the column direction row by row in the weighting data 202 is stored in the register files 411 to 413.

In the description so far, the first data control circuit 12 reads the element data of one row of the bottom data 201 from the memory 11 row by row and stores the read element data in the register file 410, but element data stored in other registers may also be used. Therefore, a method of reusing and supplementing data will be described with reference to FIG. 8.

Figure 8:
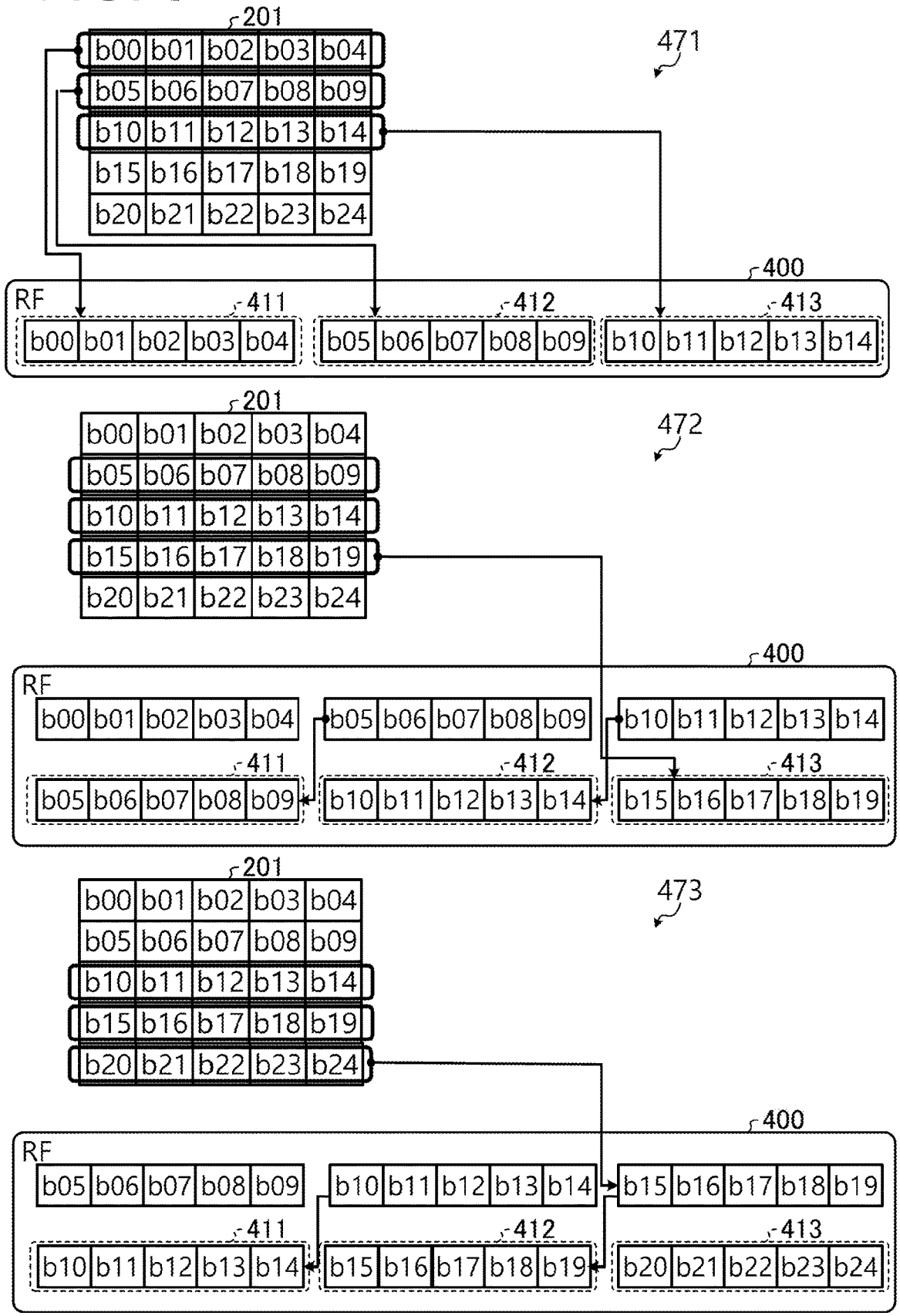
FIG. 8 is a view for explaining a method of reusing and supplementing data in a register file.

For example, as illustrated in FIG. 8, the register files 411 to 413 may be arranged in one register file 400. FIG. 8 is a view for explaining a method of reusing and supplementing data in a register file.

In this case, for example, the register file 411 may reuse the data held by the register file 412. A state 471 in FIG. 8 represents a state in which the first row is read. When the forward multiply-add operation for one row using the data stored in each of the register files 411 to 413 is completed in the state 471, the next row is stored in the register files 411 to 413, as illustrated in a state 472.

Here, the next row stored in the register file 411 is the element data held in the register file 412 in the state 471. Therefore, as illustrated in the state 472, the register file 411 reuses the information held by the register file 412. Similarly, the register file 412 reuses the information held by the register file 413. Then, the register file 413 is supplemented with element data of a new row by the first data control circuit 12.

Similarly, when the third row is read, as indicated by a state 473, the element data stored in the register files 412 and 413 by reading of the second row is reused. In this way, by reusing the element data held by the register files 411 to 413 at the time of the next operation, the reading of the element data from the memory 11 is reduced, which may make the process faster.

Although the reuse in the case where the plural register files 411 to 413 are arranged in one register file 400 has been described here, the present disclosure is not limited thereto. For example, by arranging a crossbar switch on a path between the register files 411 to 413 and the arithmetic circuits 51 to 53 and switching the crossbar switch by the first data control circuit 12, the element data may be reused among the register files 411 to 413.

Figure 9:
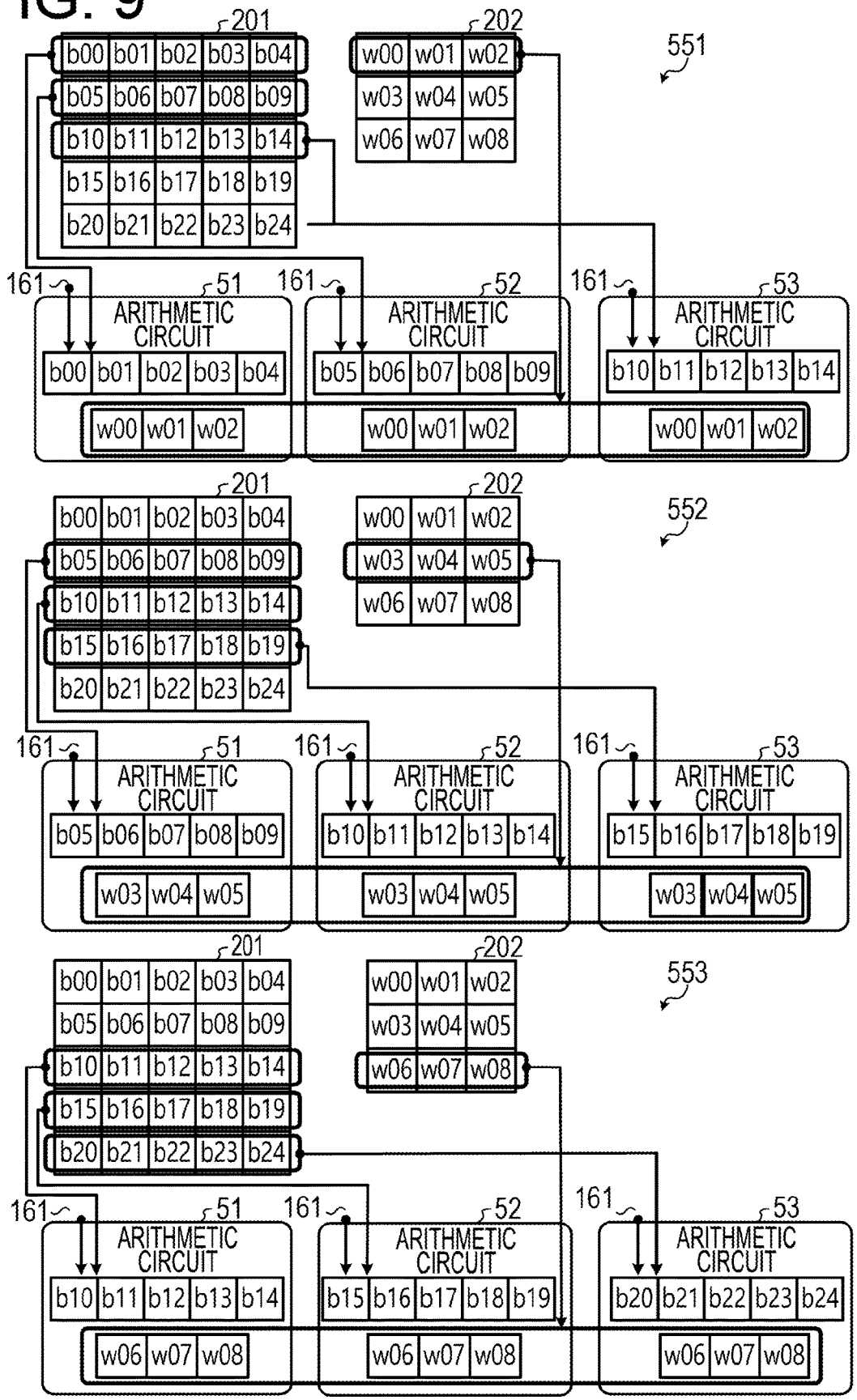
FIG. 9 is a view illustrating reading of bottom data for each row by an arithmetic circuit.

Next, the data handling in the arithmetic circuits 51 to 53 will be described. FIG. 9 is a view illustrating reading of the bottom data for each row by an arithmetic circuit. In the following description, the forward multiply-add operation for each row is referred to as a row operation.

A state 551 in FIG. 9 represents the use state of the element data of the arithmetic circuits 51 to 53 when the first row operation is performed. A state 552 represents the use state of the element data of the arithmetic circuits 51 to 53 when the second row operation is performed. A state 553 represents the use state of the element data of the arithmetic circuits 51 to 53 when the third row operation is performed. Here, a case where the stride number is 1 will be described.

In each row operation, the arithmetic circuits 51 to 53 read the element data of one row of the bottom data 201 of the register files 411 to 413. Further, the arithmetic circuit 51 reads the element data of one row of the weighting data 202 of the register files 421 to 423.

Specifically, as illustrated in the state 551, the arithmetic circuit 51 reads the element data b00 to b04 in the first row operation. The arithmetic circuit 52 also reads the element data b05 to b09 of the row advanced by the stride number from the row read by the arithmetic circuit 51. Further, the arithmetic circuit 53 reads the element data b10 to b14 of the row advanced by the stride number from the row read by the arithmetic circuit 52. At the start of the row operation, the head pointer 161 is disposed at the head of the read row. Further, the arithmetic circuits 51 to 53 read the element data w00 to w02.

Thereafter, when the first row operation is completed, as illustrated in a state 552, the arithmetic circuit 51 reads the element data b05 to b09 of a row next to the first-read row. The arithmetic circuit 52 also reads the element data b10 to b14 of the row advanced by the stride number from the row read by the arithmetic circuit 51. Further, the arithmetic circuit 53 reads the element data b15 to b19 of the row advanced by the stride number from the row read by the arithmetic circuit 52. At the start of the row operation, the head pointer 161 is disposed at the head of the read row. Further, the arithmetic circuits 51 to 53 read the element data w03 to w05.

Thereafter, when the second row operation is completed, as illustrated in a state 553, the arithmetic circuit 51 reads the element data b10 to b14 of a row next to the second-read row. The arithmetic circuit 52 also reads the element data b15 to b19 of the row advanced by the stride number from the row read by the arithmetic circuit 51. Further, the arithmetic circuit 53 reads the element data b20 to b24 of the row advanced by the stride number from the row read by the arithmetic circuit 52. At the start of the row operation, the head pointer 161 is disposed at the head of the read row. Further, the arithmetic circuits 51 to 53 read the element data w06 to w08.

Figure 10:
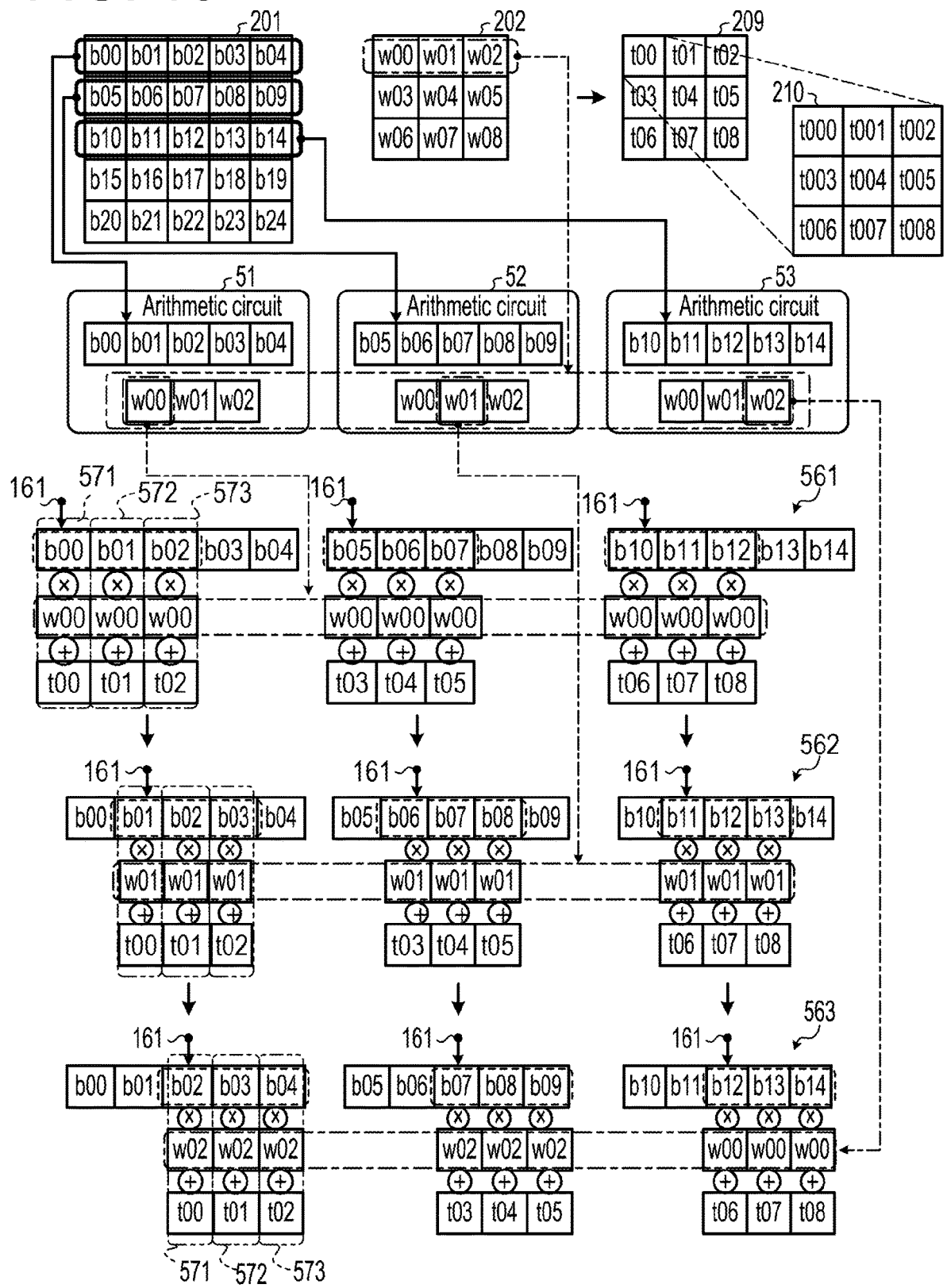
FIG. 10 is a view illustrating acquisition of element data by a multiply-add arithmetic circuit.

Next, the data acquisition for each of the multiply-add arithmetic circuits 501 to 503 in each of the arithmetic circuits 51 to 53 will be described. FIG. 10 is a view illustrating acquisition of element data by a multiply-add arithmetic circuit. Here, a description will be made of the arithmetic circuit 51 as an example. In this case, the arithmetic circuits 51 to 53 use the bottom data 201 and the weighting data 202 to perform the convolution forward operation for calculating the top data 209. The element data t00 of the top data 209 are the sum of the element data t000 to t008 indicated by the data 210.

Here, a case where the arithmetic circuits 51 to 53 perform the first row operation will be described. A state 561 represents a state in which the first forward multiply-add operation in the first row operation is performed. A state 562 represents a state in which the second forward multiply-add operation in the first row operation is performed. A state 563 represents a state in which the third forward multiply-add operation in the first row operation is performed.

When the first forward multiply-add operation is performed, the head pointer 161 is disposed at the head of the read row of the bottom data 201, as illustrated in the state 561. Then, the multiply-add arithmetic circuit 501 acquires the element data indicated by the head pointer 161. In addition, the multiply-add arithmetic circuit 502 acquires the element data next one to the position indicated by the head pointer 161. Further, the multiply-add arithmetic circuit 503 acquires the element data next two to the position indicated by the head pointer 161. Further, the multiply-add arithmetic circuits 501 to 503 acquire the element data w00 at the head of the read row of the weighting data 202.

Then, the multiply-add arithmetic circuits 501 to 503 multiply the acquired element data of the bottom data 201 and the acquired element data of the weighting data 202 and add a result of the multiplication to the calculation result up to that time. For example, an operation path 571 represents the flow of operation by the multiply-add arithmetic circuit 501 of the arithmetic circuit 51. An operation path 572 represents the flow of operation by the multiply-add arithmetic circuit 502 of the arithmetic circuit 51. An operation path 573 represents the flow of operation by the multiply-add arithmetic circuit 503 of the arithmetic circuit 51.

In reality, the operation results in the states 561 to 563 are intermediate values of operation for calculating the element data t00 to t08 of the top data 209, but the operation results are represented as the element data t00 to t08 in FIG. 10 for easy understanding. For example, the multiply-add arithmetic circuit 501 of the arithmetic circuit 51 calculates the element data t000 in the data 210 by multiplying the element data b00 and the element data w00 in the state 561. The other multiply-add arithmetic circuits 501 and 502 also calculate the element data at the same position in the element data t00 to t08 of the top data 209.

Next, the head pointer 161 is moved to the position illustrated by the state 562 by being advanced from the head by the stride number. Then, the multiply-add arithmetic circuit 501 acquires the element data indicated by the head pointer 161. In addition, the multiply-add arithmetic circuit 502 acquires the element data next one to the position indicated by the head pointer 161. Further, the multiply-add arithmetic circuit 503 acquires the element data next two to the position indicated by the head pointer 161. Further, the multiply-add arithmetic circuits 501 to 503 acquire the element data w01 next one to the head of the read row of the weighting data 202.

Then, the multiply-add arithmetic circuits 501 to 503 multiply the acquired element data of the bottom data 201 and the acquired element data of the weighting data 202. For example, the multiply-add arithmetic circuit 501 of the arithmetic circuit 51 calculates the element data t001 in the data 210 in the state 562. Then, the multiply-add arithmetic circuits 501 to 503 add a result of the multiplication to the calculation result up to that time.

Next, the head pointer 161 is moved to the position illustrated by the state 562 by being advanced from the position of the state 562 by the stride number. Then, the multiply-add arithmetic circuit 501 acquires the element data indicated by the head pointer 161. In addition, the multiply-add arithmetic circuit 502 acquires the element data next one to the position indicated by the head pointer 161. Further, the multiply-add arithmetic circuit 503 acquires the element data next two to the position indicated by the head pointer 161. Further, the multiply-add arithmetic circuits 501 to 503 acquire the element data w02 next two to the head of the read row of the weighting data 202.

Then, the multiply-add arithmetic circuits 501 to 503 multiply the acquired element data of the bottom data 201 and the acquired element data of the weighting data 202. For example, the multiply-add arithmetic circuit 501 of the arithmetic circuit 51 calculates the element data t002 in the data 210 in the state 562. Then, the multiply-add arithmetic circuits 501 to 503 add a result of the multiplication to the calculation result up to that time.

In the states 561 to 563, the forward multiply-add operation of the number of times of the top size is completed. Thus, the row operation for one row is completed. Then, the arithmetic circuits 51 to 53 repeat this row operation the number of times of the top size. That is, the arithmetic circuits 51 to 53 obtain the element data t00 to t08 of the top data 209 by repeating the forward multiply-add operation represented by each of the states 561 to 563 by the kernel number.

Figure 11B:
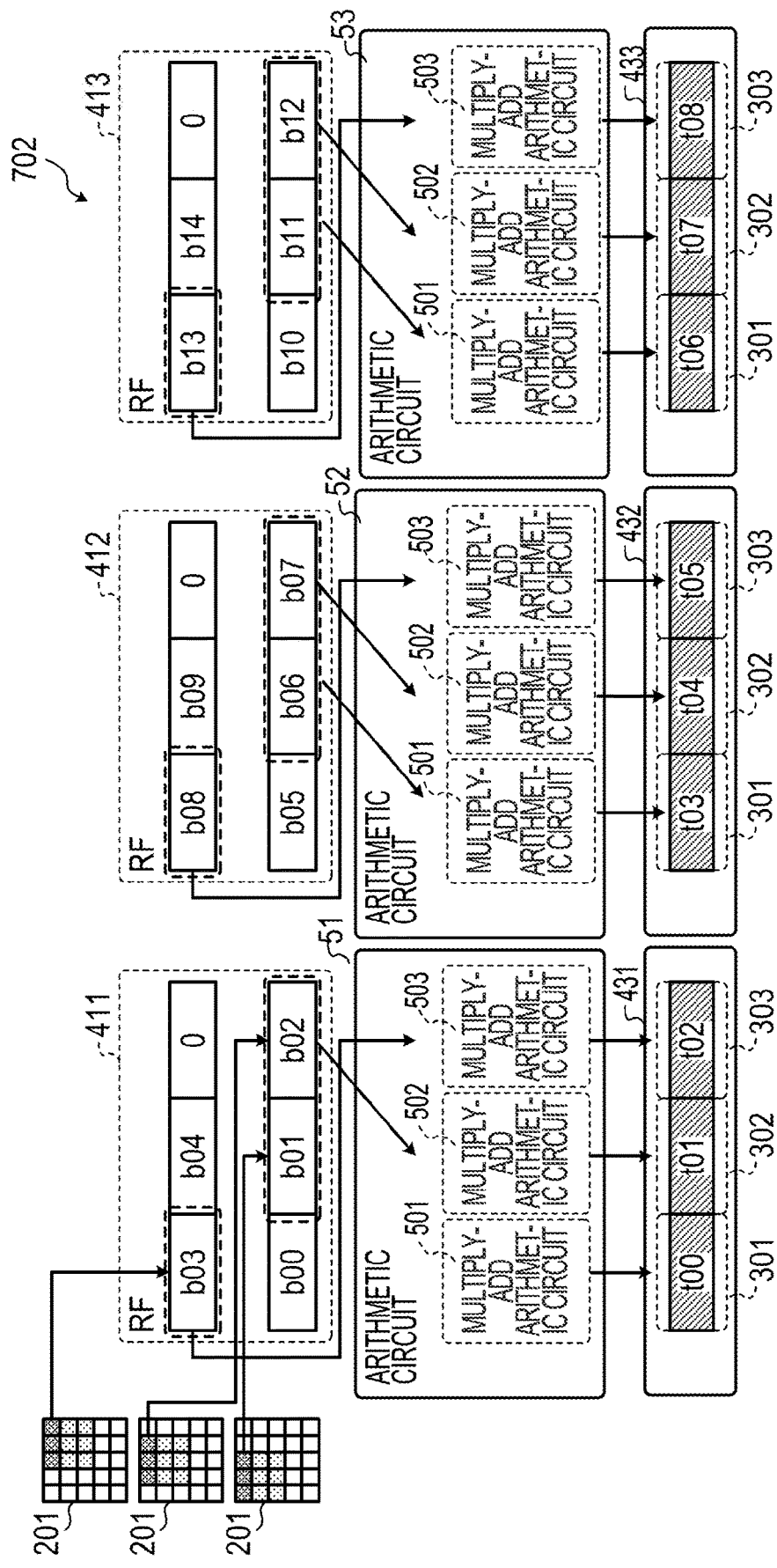
Figure 11C:
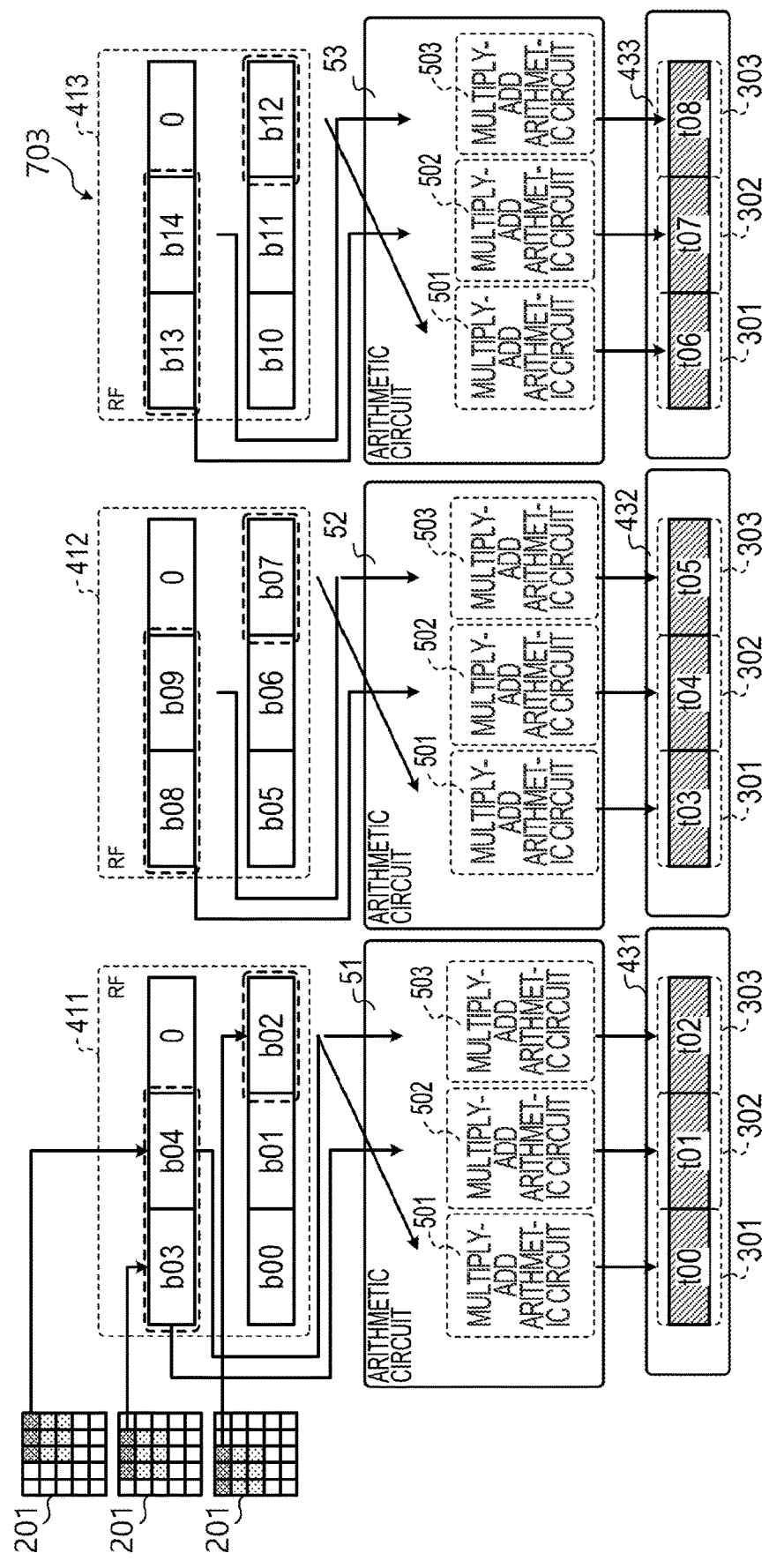

Next, the details of reading and storage of data by the multiply-add arithmetic circuits 501 to 503 will be described with reference to FIGS. 11A to 11C. FIGS. 11A to 11C are views for explaining the details of reading and storage of data by the multiply-add arithmetic circuits 501 to 503. Here, a case where the stride number is 1 will be described.

The register files 411 to 413 have an array of numbers obtained by multiplying the top size by the stride number. Then, the data read from the memory 11 are arranged in each array in the order from the head. When all the paths are used up, the data return to the head and are arranged again in the order from the head.

For example, when the convolution forward operation is started, the element data b00 and b03 are arranged in the first array of three arrays in the register file 411, the element data b01 and b04 are arranged in the second array, and the element data b02 and 0 are arranged in the third array. Here, 0 is a value when there is no element data. Similarly, data are also stored in the register files 412 and 413. As a result, the storage state of the element data of the register files 411 to 413 is the state represented by a state 701.

Next, the processings of the arithmetic circuits 51 to 53 will be described, but since the processings are the same, a description will be given by taking the arithmetic circuit 51 as an example. As illustrated in the state 701, the multiply-add arithmetic circuits 501 to 503 of the arithmetic circuit 51 read the first element data b00 to b02 of the array of the register file 411, respectively. Here, the position on the bottom data 201 illustrated at the left end of FIGS. 11A to 11C respectively represents the position on the bottom data 201 of the element data read by the multiply-add arithmetic circuits 501 to 503. Then, the multiply-add arithmetic circuits 501 to 503 of the arithmetic circuit 51 perform the forward multiply-add operation.

Thereafter, the multiply-add arithmetic circuit 501 stores an intermediate value of calculation of the element data t00 in the register file 301. The multiply-add arithmetic circuits 502 and 503 also perform the same calculation. The values stored in the register files 301 to 303 are actually intermediate values of calculation, but element data to be calculated are described in FIGS. 11A to 11C for easy understanding.

Next, as illustrated in a state 702, the multiply-add arithmetic circuits 501 to 503 read the element data in order from the position where the head is advanced by the stride number. Then, the multiply-add arithmetic circuits 501 to 503 perform the forward multiply-add operation. Thereafter, the multiply-add arithmetic circuits 501 to 503 store a result of this operation and add the operation result to the values of the register files 301 to 303.

Next, as illustrated in a state 703, the multiply-add arithmetic circuits 501 to 503 read the element data in order from the position where the head is advanced from the state 702 by the stride number. Then, the multiply-add arithmetic circuits 501 to 503 perform the forward multiply-add operation. Thereafter, the multiply-add arithmetic circuits 501 to 503 store a result of this operation and add the operation result to the values of the register files 301 to 303.

In this way, the multiply-add arithmetic circuits 501 to 503 acquire the element data from the respective arrays in the register file 411. The register file 411 permits acquisition of one element data from one array. That is, reading of the element data by the multiply-add arithmetic circuits 501 to 503 does not cause a conflict.

Further, the multiply-add arithmetic circuits 501 to 503 may calculate the element data of the top data 209 simply by adding data to the values held by the same register files 301 to 303. That is, it is not necessary to perform a processing such as data movement in order to calculate the top data 209.

As indicated by the position on the bottom data 201 on the left end, the multiply-add arithmetic circuit 501 repeats the operation of the corresponding element data in a state in which the upper end and the right end of the bottom data 201 and the weighting data 202 are made to coincide with each other. That is, the multiply-add arithmetic circuit 501 completes the operation for one row of the corresponding element data in a state in which the upper end and the right end of the bottom data 201 and the weighting data 202 are made to coincide with each other, with the calculation in the states 701 to 703. The multiply-add arithmetic circuit 501 performs the convolution forward operation when the upper end and the right end of the bottom data 201 and the weighting data 202 are made to coincide with each other by repeating the above-described process for each row. That is, the multiply-add arithmetic circuit 501 calculates one element data t00 of the top data 209. Similarly, the multiply-add arithmetic circuits 502 and 503 calculate the element data t01 and t02, respectively.

Figure 12:
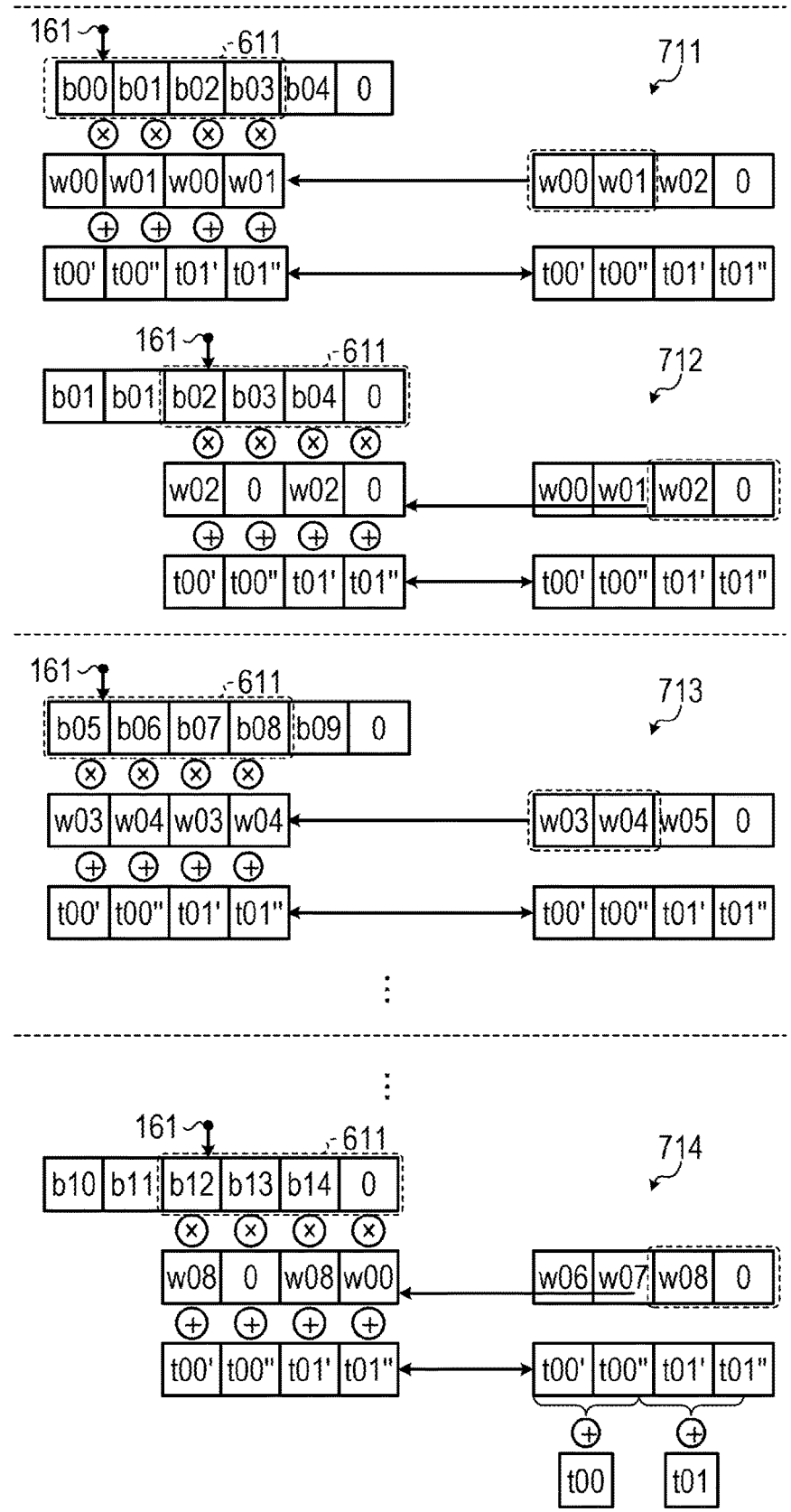
FIG. 12 is a view for explaining the details of the convolution forward operation when the stride number is 2 according to a first embodiment.

Next, the details of the convolution forward operation by the multiply-add arithmetic circuits 501 to 503 when the stride number is 2 will be described with reference to FIG. 12. FIG. 12 is a view for explaining details of the convolution forward operation in the case where the stride number is 2 according to the first embodiment. Here, the calculation by the multiply-add arithmetic circuits 510 to 513 of the arithmetic circuit 51 in FIG. 5 will be described as an example.

The multiply-add arithmetic circuits 510 to 513 perform the operation illustrated in the state 711. That is, among the element data b00 to b09 stored in the register file 411, the element data b00 to b03 enclosed by four frames 611, which are values obtained by multiplying the top size and the stride number, are read in the order from the position indicated by the head pointer 161. Further, the multiply-add arithmetic circuits 510 and 511 read the element data w00 and w01 of the stride number from the head of the first row of the weighting data 202 stored in the register file 412. The multiply-add arithmetic circuits 512 and 513 also read the element data w00 and w01 of the stride number from the head of the first row of the weighting data.

Then, the multiply-add arithmetic circuits 510 and 511 uses the read data to perform the forward multiply-add operation and calculate data t00' and t00" which are respectively intermediate values of the operation of the element data t00. In addition, the multiply-add arithmetic circuits 512 and 513 use the read data to perform the forward multiply-add operation and calculate element data t01' and t01" which are respectively intermediate values of the operation of the element data t01. Then, the multiply-add arithmetic circuits 510 to 513 add the calculated data to the values stored in the register file 413 and store the addition result at the same position.

Next, the multiply-add arithmetic circuits 510 to 513 perform the operation illustrated in the state 711. In this case, in the element data b00 to b09 stored in the register file 411, the head pointer 161 is advanced by the stride number. Then, the multiply-add arithmetic circuits 510 to 513 read the element data b02 to b04 and 0 enclosed by four frames 611, which are values obtained by multiplying the top size and the stride number, in the order from the position indicated by the head pointer 161. In this case, since there is no element data next to the element data b04, the value read by the multiply-add arithmetic circuit 513 is 0. Further, the multiply-add arithmetic circuits 510 and 511 read the element data w02 and 0 of the stride number, respectively, from the position advanced by the stride number from the head of the first row of the weighting data 202 stored in the register file 412. In this case, since there is no element data next to the element data w02, the value read by the multiply-add arithmetic circuit 511 is 0. Similarly, the multiply-add arithmetic circuits 512 and 513 also read the element data w02 and 0.

Then, the multiply-add arithmetic circuits 510 and 511 use the read data to perform the forward multiply-add operation and calculate data t00' and t00" which are respectively intermediate values of the operation of the element data t00. In addition, the multiply-add arithmetic circuits 512 and 513 uses the read data to perform the forward multiply-add operation and calculate data t01' and t01" which are respectively intermediate values of the operation of the element data t01. Then, the multiply-add arithmetic circuits 510 to 513 add the calculated data to the values stored in the register file 413 and store the addition result at the same position.

Here, since the addition for the top size has been completed, the multiply-add arithmetic circuits 510 to 513 complete calculation of one row of the element data t00 and t01 of the top data 209, respectively. Next, the multiply-add arithmetic circuits 510 to 513 advance one row to be read in the bottom data 201 and the weighting data 202, and execute the operation of the second row represented by the state 713.

In this calculation, the element data to be handled is different from that in the first row, but the operation method is the same.

Then, the multiply-add arithmetic circuits 510 to 513 perform the operation of the second half of the third row shown in the state 714. According to this, the operation of all rows of the weighting data 202 is completed. Then, the arithmetic circuit 51 adds the data t00' calculated by the multiply-add arithmetic circuit 510 and the data t00" calculated by the multiply-add calculation circuit 511 to calculate the element data t00. Similarly, the arithmetic circuit 51 adds the data t01' and the data t01" to calculate the element data t01.

Figure 13:
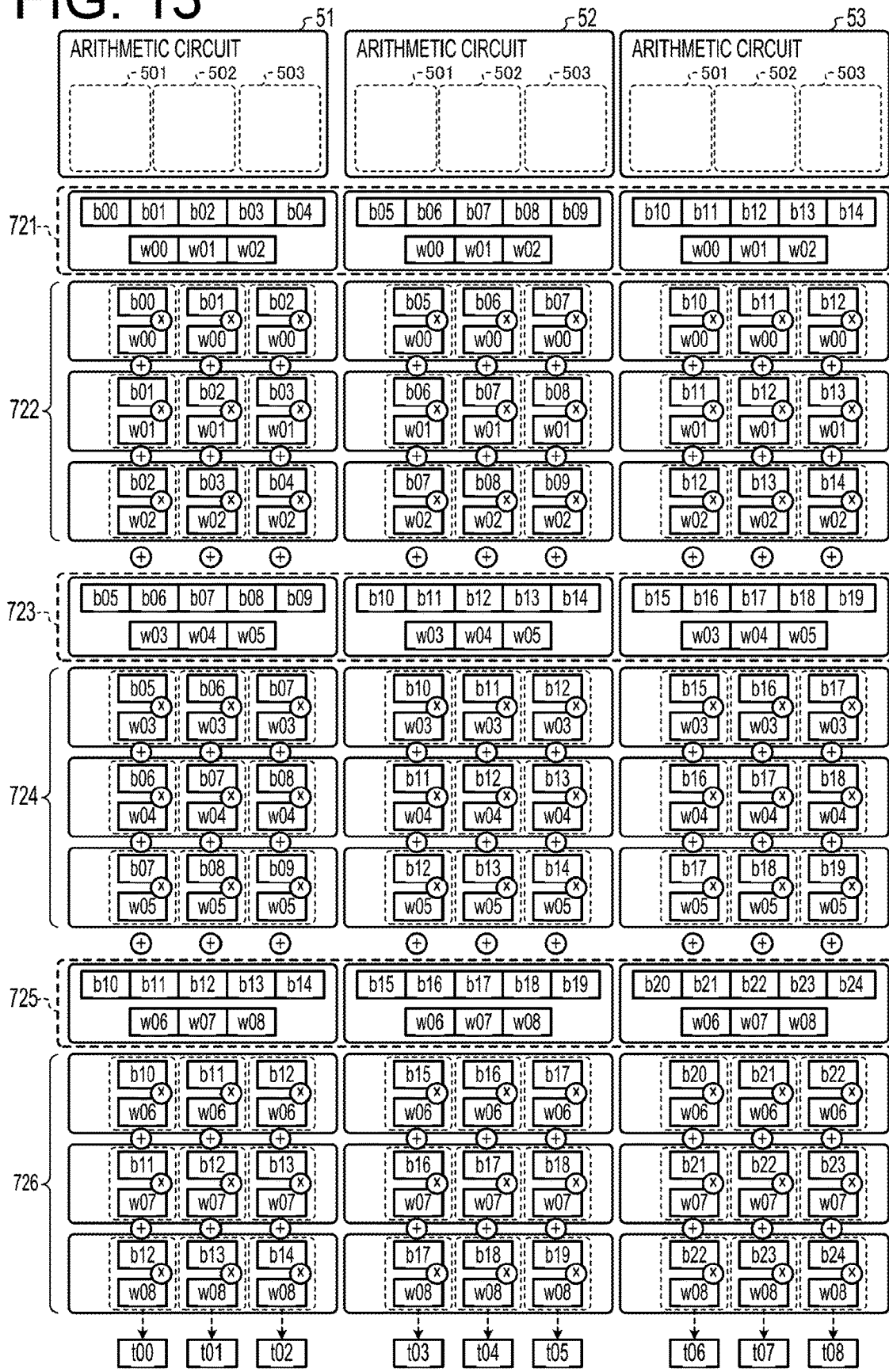
FIG. 13 is a view illustrating the entire convolution forward operation when the stride number is 1.

Next, the entire convolution forward operation when the stride number is 1 will be described collectively with reference to FIG. 13. FIG. 13 is a view illustrating the entire convolution forward operation when the stride number is 1.

In FIG. 13, the column positioned under each of the multiply-add arithmetic circuits 501 to 503 of the respective arithmetic circuits 51 to 53 represents an operation to be executed. First, the arithmetic circuits 51 to 53 acquire the element data of each row of the bottom data 201 and the weighting data 202 illustrated in a frame 721, respectively. Then, each of the multiply-add arithmetic circuits 501 to 503 uses the element data read by the arithmetic circuits 51 to 53 one by one to perform the row operation 722. In the row operation 722, the multiply-add arithmetic circuits 501 to 503 execute three forward multiply-add operations.

Next, the arithmetic circuits 51 to 53 acquire the element data of each row of the bottom data 201 and the weighting data 202 illustrated in a frame 723, respectively. Then, each of the multiply-add arithmetic circuits 501 to 503 uses the element data read by the arithmetic circuits 51 to 53 one by one to perform a row operation 724. In the row operation 724, the multiply-add arithmetic circuits 501 to 503 execute three forward multiply-add operations. The value calculated by the row operation 724 is added to the operation result of the row operation 722.

Next, the arithmetic circuits 51 to 53 acquire the element data of each row of the bottom data 201 and the weighting data 202 illustrated in a frame 725, respectively. Then, each of the multiply-add arithmetic circuits 501 to 503 uses the element data read by the arithmetic circuits 51 to 53 one by one to perform a row operation 726. In the row operation 726, the multiply-add arithmetic circuits 501 to 503 execute three forward multiply-add operations. The value calculated by the row operation 726 is added to the operation result of the row operation 724.

Then, each of the multiply-add arithmetic circuits 501 to 503 executes the row operations 722, 724 and 726 to calculate the element data t00 to t08 of the top data 209.

Figure 14:
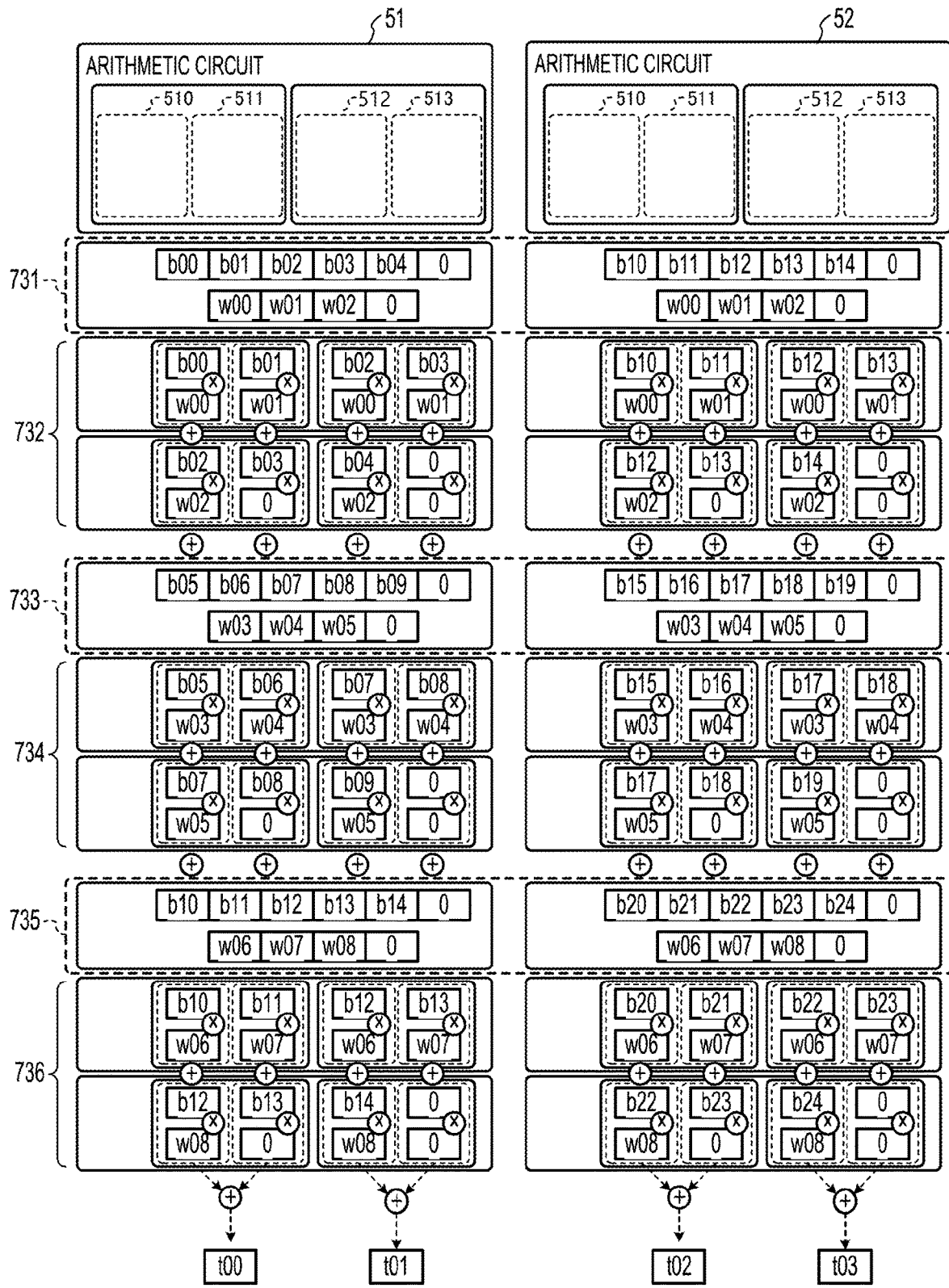
FIG. 14 is a view illustrating the entire convolution forward operation when the stride number is 2.

Next, the entire convolution forward calculation when the stride number is 2 or more will be described collectively with reference to FIG. 14. FIG. 14 is a view illustrating the entire convolution forward operation when the stride number is 2.

In FIG. 14, the column positioned under each of the multiply-add arithmetic circuits 501 to 503 of the respective arithmetic circuits 51 to 53 represents an operation to be executed. When the stride number is 2, one element data of the top data 209 is calculated by the multiply-add arithmetic circuits 510 and 511 of the stride number and the multiply-add arithmetic circuits 512 and 513. Therefore, in FIG. 14, among the multiply-add arithmetic circuits 510 to 513, the calculation of the same element data is enclosed and indicated by a frame.

First, the arithmetic circuits 51 to 53 acquire the element data of each row of the bottom data 201 and the weighting data 202 illustrated in a frame 731, respectively. Here, the multiply-add arithmetic circuits 510 to 513 read the element data of the position advanced by the stride number from the element data read in the previous operation in the bottom data 201 and the weighting data 202 for each forward multiply-add operation. Therefore, there may be no element data to be read. Therefore, 0 is added to the position where there is no element data to be read.

Each of the multiply-add arithmetic circuits 510 to 513 uses the element data read by the arithmetic circuits 51 to 53 one by one to perform a row operation 732. In the row operation 732, the multiply-add arithmetic circuits 510 to 513 execute two forward multiply-add operations. Every time the forward multiply-add operation is completed, the multiply-add arithmetic circuits 510 to 513 read the element data at the position advanced by the stride number from the element data read in the previous operation in the bottom data 201.

Next, the arithmetic circuits 51 to 53 acquire the element data of each row of the bottom data 201 and the weighting data 202 illustrated in a frame 733, respectively. Then, each of the multiply-add arithmetic circuits 510 to 513 uses the element data read by the arithmetic circuits 51 to 53 one by one to performs a row operation 734. In the row operation 734, the multiply-add arithmetic circuits 510 to 513 execute two forward multiply-add operations. The value calculated by the row operation 734 is added to the operation result of the row operation 732.

Next, the arithmetic circuits 51 to 53 acquire the element data of each row of the bottom data 201 and the weighting data 202 illustrated in a frame 735, respectively. Then, each of the multiply-add arithmetic circuits 510 to 513 uses the element data read by the arithmetic circuits 51 to 53 one by one to performs a row operation 736. In the row operation 736, the multiply-add arithmetic circuits 510 to 513 execute two forward multiply-add operations. The value calculated by the row operation 736 is added to the operation result of the row operation 734.

Thereafter, the operation result of the multiply-add arithmetic circuit 510 and the operation result of the multiply-add arithmetic circuit 511 are added. In addition, the operation result of the multiply-add arithmetic circuit 512 and the operation result of the multiply-add arithmetic circuit 513 are added. As a result, the operation of the element data t00 to t03 of the top data 209 is completed.

Figure 15:
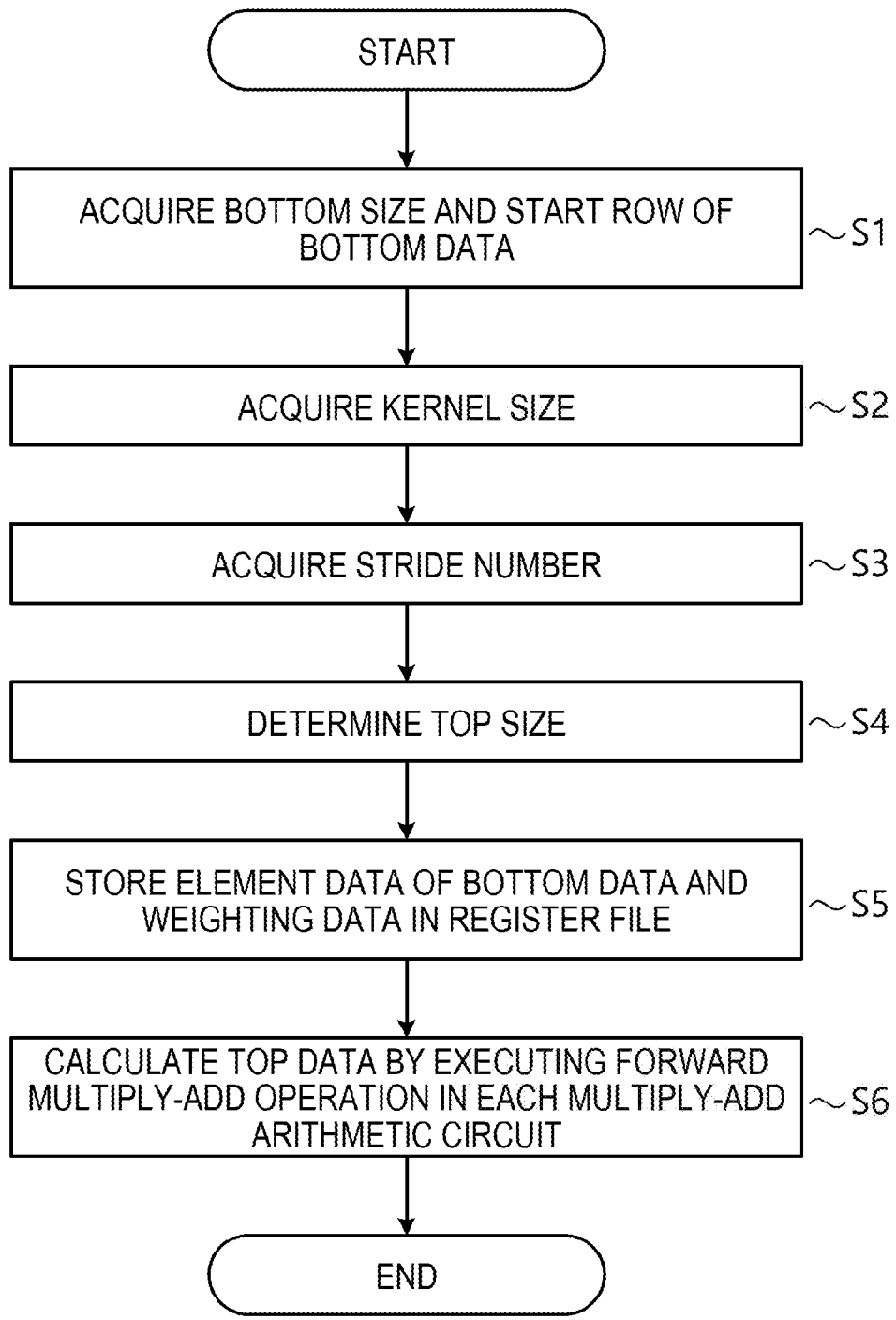
FIG. 15 is a flowchart of the convolution forward operation.

Next, an overall flow of the convolution forward operation will be described with reference to FIG. 15. FIG. 15 is a flowchart of the convolution forward operation.

According to an input from an operator, the arithmetic circuits 51 to 53 acquire a bottom size which is the number of element data in the row direction of the bottom data 201, and a start row of the convolution forward operation (step S1).

Next, the arithmetic circuits 51 to 53 acquire a kernel size according to an input from the operator (step S2).

Next, the arithmetic circuits 51 to 53 acquire a stride number according to an input from the operator (step S3).

Next, the arithmetic circuits 51 to 53 determine a top size of the top data 209 from the bottom size, the kernel size, and the stride number (step S4).

Next, the first data control circuit 12 stores the element data of a designated row of the bottom data 201 in the register files 411 to 413. In addition, the second data control circuit 13 stores the element data of a designated row of the weighting data 202 in the register files 421 to 423 (step S5).

Each of the multiply-add arithmetic circuits 501 to 503 of the arithmetic circuits 51 to 53 executes the forward multiply-add operation to calculate the top data 209 (step S6). The arithmetic circuits 51 to 53 notify the operator of the calculation result.

Figure 16:
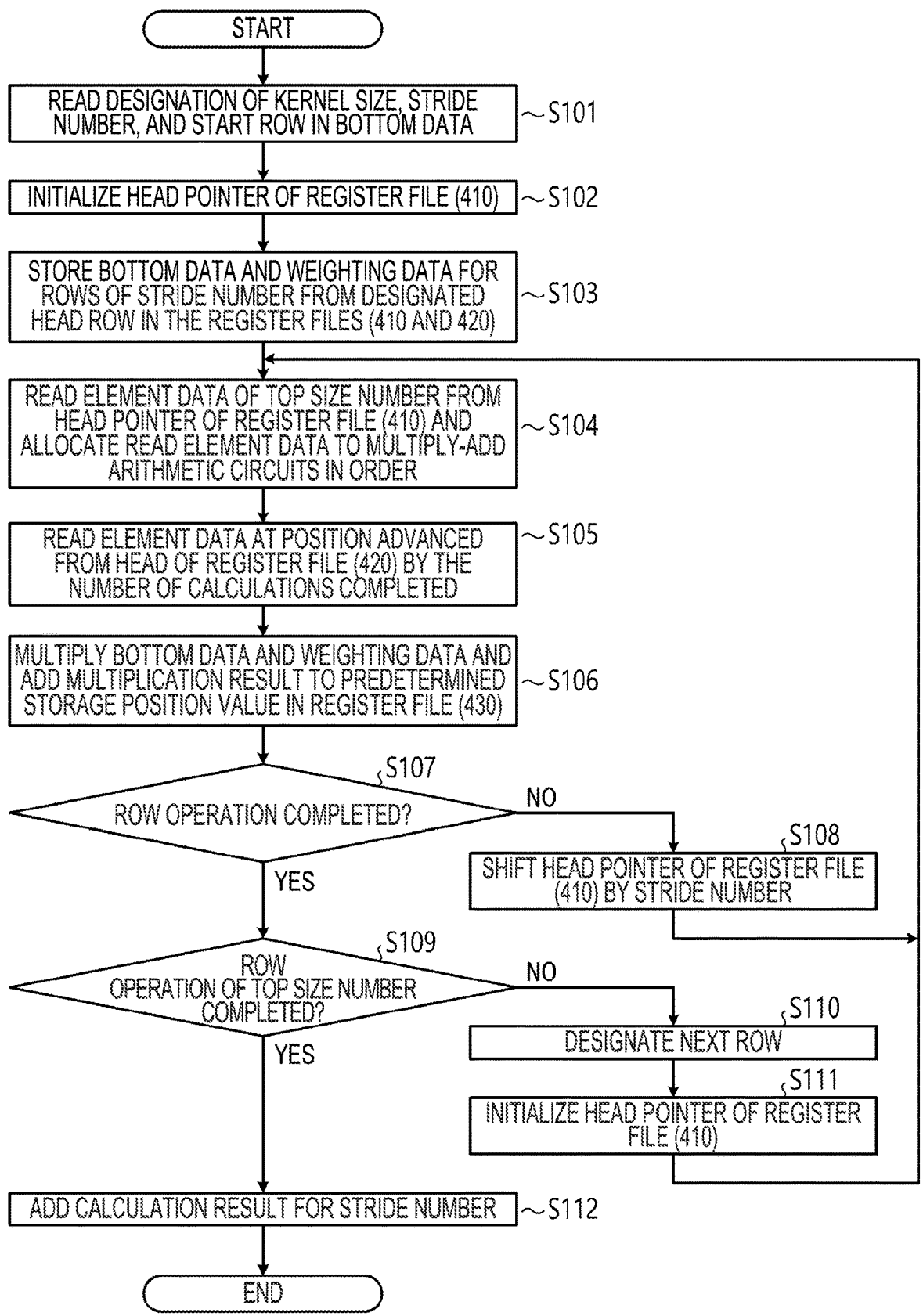
FIG. 16 is a flowchart of a forward multiply-add operation according to the first embodiment.

Next, the flow of forward multiply-add operation according to this embodiment will be described in detail with reference to FIG. 16. FIG. 16 is a flowchart of the forward multiply-add operation according to the first embodiment.

The arithmetic circuits 51 to 53 read the kernel size, the stride number, and the start row in the bottom data designated by the operator (step S101).

The pointer control circuit 16 initializes the head pointer of the register file 410 (step S102).

Next, the first data control circuit 12 and the second data control circuit 13 store the bottom data 201 and the weighting data 202 for the rows of the stride number from the designated head row in the register files 410 and 420, respectively (step S103).

The arithmetic circuits 51 to 53 read the element data of the top size number from the head pointer of the register file 410 and allocate the read element data to the multiply-add arithmetic circuits 501 to 503 in order (step S104).

In addition, the arithmetic circuits 51 to 53 read the element data at the position advanced from the head of the register file 420 by the number of calculations completed and allocate the read element data to the multiply-add arithmetic circuits 501 to 503 in order (step S105).

The multiply-add arithmetic circuits 501 to 503 multiply the acquired element data of the bottom data 201 and the acquired element data of the weighting data 202 and store the multiplication result in a predetermined corresponding storage position in the register file 430 (step S106).

The arithmetic circuits 51 to 53 determine whether the row operation has been completed, depending on whether the operation of steps S104 to S106 has been completed by the top size number (step S107). When it is determined that the operation has not been completed by the top size number ("No" in step S107), the pointer control circuit 16 shifts the head pointer of the register file 410 by the stride number (step S108). Thereafter, the arithmetic circuits 51 to 53 return to step S104.

In the meantime, when it is determined that the operation has been completed by the top size number ("Yes" in step S107), the arithmetic circuits 51 to 53 determine whether the row operation of the top size number has been completed (step S109). When it is determined that the row operation of the top size number has not been completed ("No" in step S109), the arithmetic circuits 51 to 53 designate the next row as a row serving as an operation target of the bottom data 201 and the weighting data 202 (step S110).

Next, the pointer control circuit 16 initializes the head pointer of the register file 410 (step S111). In this case, the head pointer of the register file 410 is moved to the head of the row stored in the register file 410. Thereafter, the arithmetic circuits 51 to 53 return to step S103.

In the meantime, when it is determined that the row operation of the top size number has been completed ("Yes" in step S109), the arithmetic circuits 51 to 53 add the calculation results for the stride number (step S112). As a result, each element data of the top data 209 is calculated.

As described above, in the arithmetic processing device according to the present embodiment, in the forward multiply-add operation, since the multiply-add arithmetic circuit reads different arrays of data among the data stored in the register file, it is possible to avoid a conflict at the time of data reading. In addition, in the forward multiply-add operation, since a preprocessing such as rearrangement of data and creation of data copy for avoiding conflicts is not performed, the calculation time may be shortened. Further, by simultaneously using the plural multiply-add arithmetic circuits to execute the forward multiply-add operations in parallel, it is possible to shorten the calculation time of the entire convolution forward operation.

Second Embodiment

Next, a second embodiment will be described. An arithmetic processing device according to the second embodiment is different from the first embodiment in that one arithmetic circuit and multiply-add arithmetic circuits of a stride number are used to perform the convolution forward operation. Here, a case where the stride number is 2 will be described as an example. A case where there is one arithmetic circuit 51 in FIG. 5 and the arithmetic circuit 51 has multiply-add arithmetic circuits 510 and 511 will be described.

In this case, the multiply-add arithmetic circuits 510 and 511 perform the same operation as the multiply-add arithmetic circuits 510 and 511 of the arithmetic circuit 51 in the first embodiment. Thus, each of the multiply-add arithmetic circuits 510 and 511 obtains an intermediate value of the operation of the element data t00 of the top data 209. Then, the multiply-add arithmetic circuits 510 and 511 add the operation results to obtain the element data t00 of the top data 209.

Next, the multiply-add arithmetic circuits 510 and 511 sequentially execute the respective processes executed by the multiply-add arithmetic circuits 512 and 513 of the arithmetic circuit 51 in the first embodiment. Thus, the multiply-add arithmetic circuit 510 obtains the element data t01 of the top data 209.

Further, the multiply-add arithmetic circuits 510 and 511 sequentially execute the respective processes executed by the multiply-add arithmetic circuits 510 to 513 of the arithmetic circuit 52 in the first embodiment. Thus, the multiply-add arithmetic circuits 510 and 511 obtain the element data t02 and t03 of the top data 209.

As described above, the multiply-add arithmetic circuits 510 and 511 may obtain all of the element data t00 to t03 of the top data 209 by sequentially executing the arithmetic operations performed by the multiply-add arithmetic circuits 510 to 513 of each of the arithmetic circuits 51 and 52 in the first embodiment.

Figure 17:
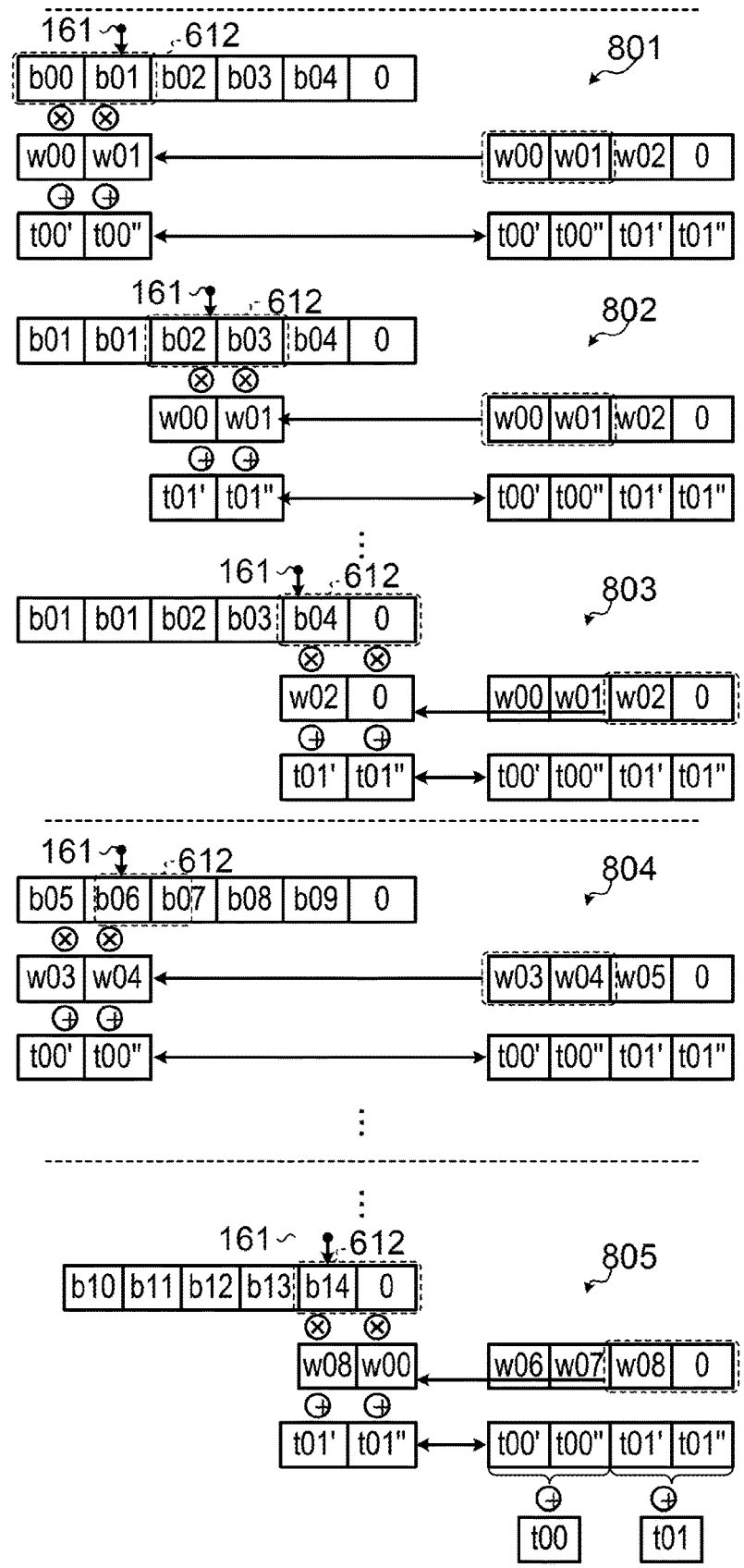
FIG. 17 is a view for explaining the details of the convolution forward operation when the stride number is 2 according to a second embodiment.

Here, the operation procedure of the convolution forward operation by the multiply-add arithmetic circuit 510 will be described with reference to FIG. 17. FIG. 17 is a view for explaining details of the convolution forward operation when the stride number is 2 according to the second embodiment.

In a first operation 801 of the row operation of the first row at the start of the convolution forward multiply-add operation, the multiply-add arithmetic circuits 510 and 511 read two pieces of element data b00 and b01 corresponding to the stride number from the head pointer 161 enclosed by the frame 612. Further, the multiply-add arithmetic circuits 510 and 511 read two pieces of element data w00 and w01 corresponding to the stride number from the head of the weighting data 202. Then, the multiply-add arithmetic circuits 510 and 511 multiply the acquired element data and add the multiplication result to the values stored in the register file 430 to calculate the data t00' and t00" which are intermediate values of the element data t00 of the top data 209. Thereafter, the multiply-add arithmetic circuits 510 and 511 store the calculated data t00' and t00" in the register file 430.

In a second operation 802 of the row operation of the first row, the head pointer 161 is disposed at a position advanced from the position of the operation 801 in the direction of several rows of the multiply-add arithmetic circuits 510 and 511. Then, the multiply-add arithmetic circuits 510 and 511 read two element data b02 and b03 corresponding to the stride number from the head pointer 161. Further, the multiply-add arithmetic circuits 510 and 511 read two pieces of element data w00 and w01 corresponding to the stride number from the head of the weighting data 202. Then, the multiply-add arithmetic circuits 510 and 511 multiply the acquired element data and add the multiplication result to the values stored in the register file 430 to calculate data t01' and t01" which are intermediate values of the element data t01 of the top data 209. Thereafter, the multiply-add arithmetic circuits 510 and 511 store the calculated data t00' and t00" in the register file 430.

The multiply-add arithmetic circuits 510 and 511 repeat the same calculation. Then, in a third operation 803 of the row operation of the first row, the head pointer 161 is disposed at a position advanced in the direction of two rows of the multiply-add arithmetic circuits 510 and 511 from the position at which the movement by the stride number from the head is performed once. Then, the multiply-add arithmetic circuits 510 and 511 read two pieces of element data b04 and 0 corresponding to the stride number from the head pointer 161. Further, the multiply-add arithmetic circuits 510 and 511 read two pieces of element data w02 and 0 corresponding to the stride number from a position advanced by two rows of the multiply-add arithmetic circuits 510 and 511 from the head of the weighting data 202. Then, the multiply-add arithmetic circuits 510 and 511 multiply the acquired element data to calculate the data t01' and t01" which are intermediate values of the element data t01 of the top data 209. Thus, the multiply-add arithmetic circuits 510 and 511 complete the row operation.

Thereafter, the multiply-add arithmetic circuits 510 and 511 repeat the same row operation while shifting the rows to be operated one by one. An operation 804 represents the first operation of the row operation of the second row. In addition, an operation 805 represents the fourth operation of the row operation of the third row. Thereafter, the multiply-add arithmetic circuits 510 and 511 sum the respective calculated intermediate values of the element data t00 to t0 of the top data 209. Thus, the multiply-add arithmetic circuits 510 and 511 calculate the element data t00 to t01 of the top data 209.

Subsequently, the multiply-add arithmetic circuits 510 and 511 repeat the same operation from the state in which the start row in the bottom data 201 is moved in the column direction by the stride number, to calculate the element data t02 and t03 of the top data 209. Thus, the multiply-add arithmetic circuits 510 and 511 may obtain the top data 209 formed with the element data t00 to t03.

Figure 18:
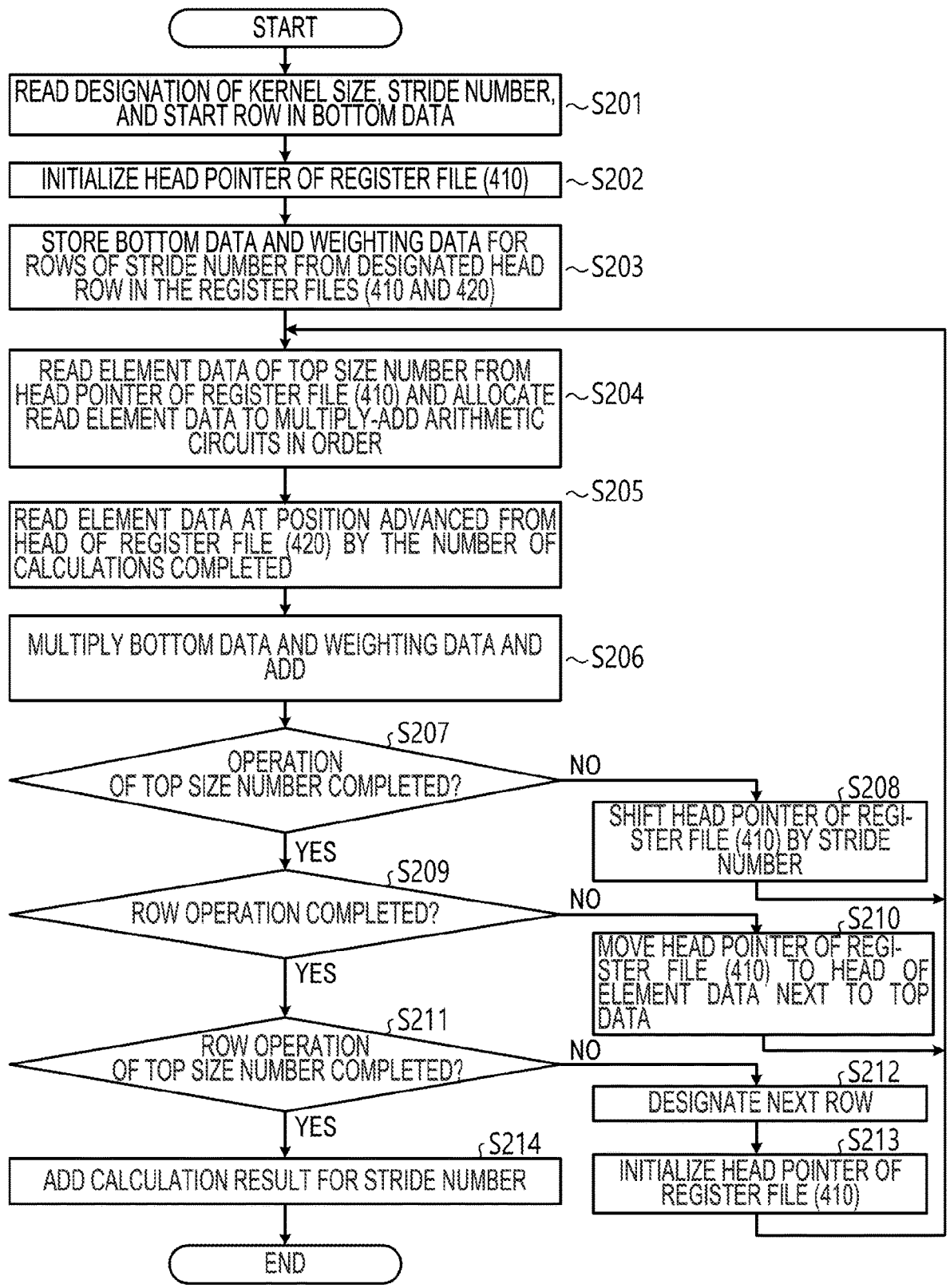
FIG. 18 is a flowchart of a forward multiply-add operation according to the second embodiment.

Next, the flow of forward multiply-add operation according to the second embodiment will be described in detail with reference to FIG. 18. FIG. 18 is a flowchart of the forward multiply-add operation according to the second embodiment.

The arithmetic circuit 51 reads the kernel size, the stride number, and the start row in the bottom data designated by the operator (step S201).

The pointer control circuit 16 initializes the head pointer of the register file 410 (step S202).

Next, the first data control circuit 12 and the second data control circuit 13 store the bottom data and the weighting data for the rows of the stride number from a designated head row in the register files 410 and 420, respectively (step S203).

The arithmetic circuit 51 reads the element data of the top size number from the head pointer 161 of the register file 410 and allocates the element data to the multiply-add arithmetic circuits 501 to 503 of the stride number in order (step S204).

Further, the multiply-add arithmetic circuits 501 to 503 of the arithmetic circuit 51 read the element data at the position advanced by the number of times of completed calculation from the head of the register file 420 (step S205).

The multiply-add arithmetic circuits 501 to 503 multiply the acquired element data of the bottom data 201 and the acquired element data of the weighting data 202, and add the multiplication result to the corresponding predetermined storage position value in the register file 430 (step S206).

The arithmetic circuit 51 determines whether execution of the operation of steps S204 to S206 has been completed by the top size number (step S207). When it is determined that the operation has not been completed by the top size number ("No" in step S207), the pointer control circuit 16 shifts the head pointer of the register file 410 by the number of multiply-add arithmetic circuits 501 to 503, that is, by the stride number (step S208). Thereafter, the arithmetic circuit 51 returns to step S204.

In the meantime, when it is determined that the operation has been completed by the top size number ("Yes" in step S207), the arithmetic circuit 51 determines whether the row operation has been completed, depending on whether the execution of the operation of steps S204 to S207 has been completed by the top size number (step S209). When it is determined that the row operation has not been completed ("No" in step S209), the pointer control circuit 16 moves the head pointer 161 of the register file 410 to the head in the calculation of the next element data of the top data 209 (step S210). In other words, the pointer control circuit 16 disposes the head pointer 161 at the position advanced by the stride number from the position of the first head pointer 161 in the previous operation from step S204 to step S207. Thereafter, the arithmetic circuit 51 returns to step S204.

In the meantime, when it is determined that the row operation has been completed ("Yes" in step S209), the arithmetic circuit 51 determines whether the row operation of the top size number has been completed (step S211). When it is determined that the row operation of the top size number has not been completed ("No" in step S211), the arithmetic circuit 51 designates the next row as a row serving as an operation target of the bottom data 201 and the weighting data 202 (step S212).

Next, the pointer control circuit 16 initializes the head pointer 161 of the register file 410 (step S213). In this case, the head pointer 16 of the register file 410 is moved to the head of the row stored in the register file 410. Thereafter, the arithmetic circuit 51 returns to step S203.

In the meantime, when it is determined that the row operation of the top size number has been completed ("Yes" in step S211), the arithmetic circuit 51 adds the calculation results for the stride number (step S214). Thus, each element data of the top data 209 is calculated.

As described above, the arithmetic processing device according to the second embodiment executes the convolution forward operation with a configuration in which multiply-add arithmetic circuits of the number corresponding to the stride number are arranged in one arithmetic circuit.

Even in this case, it is possible to avoid conflicts at the time of data reading and shorten calculation time.

Third Embodiment

Next, a third embodiment will be described. An arithmetic processing device according to the third embodiment is different from the first embodiment in that one arithmetic circuit and multiply-add arithmetic circuits of the number obtained by multiplying the top size and the stride number are used to perform the convolution forward operation. Here, a case where the stride number is 2 will be described as an example. A case where there is one arithmetic circuit 51 in FIG. 5 and the arithmetic circuit 51 has four multiply-add arithmetic circuits 510 to 513 will be described.

In this case, the multiply-add arithmetic circuits 510 to 513 perform the same operation as the multiply-add arithmetic circuits 510 to 513 of the arithmetic circuit 51 in the first embodiment. Thus, each of the multiply-add arithmetic circuits 510 and 511 obtains an intermediate value of the operation of the element data t00 and t01 of the top data 209. Then, the multiply-add arithmetic circuits 510 to 513 add the operation results to obtain the element data t00 and t01 of the top data 209.

Next, the multiply-add arithmetic circuits 510 and 511 execute the respective processings executed by the multiply-add arithmetic circuits 510 to 513 of the arithmetic circuit 52 in the first embodiment. Thus, the multiply-add arithmetic circuits 510 and 511 obtain the element data t02 and t03 of the top data 209.

As described above, the multiply-add arithmetic circuits 510 to 513 may obtain all of the element data t00 to t03 of the top data 209 by sequentially executing the arithmetic operations performed by the multiply-add arithmetic circuits 510 to 513 of each of the arithmetic circuits 51 and 52 in the first embodiment.

Figure 19:
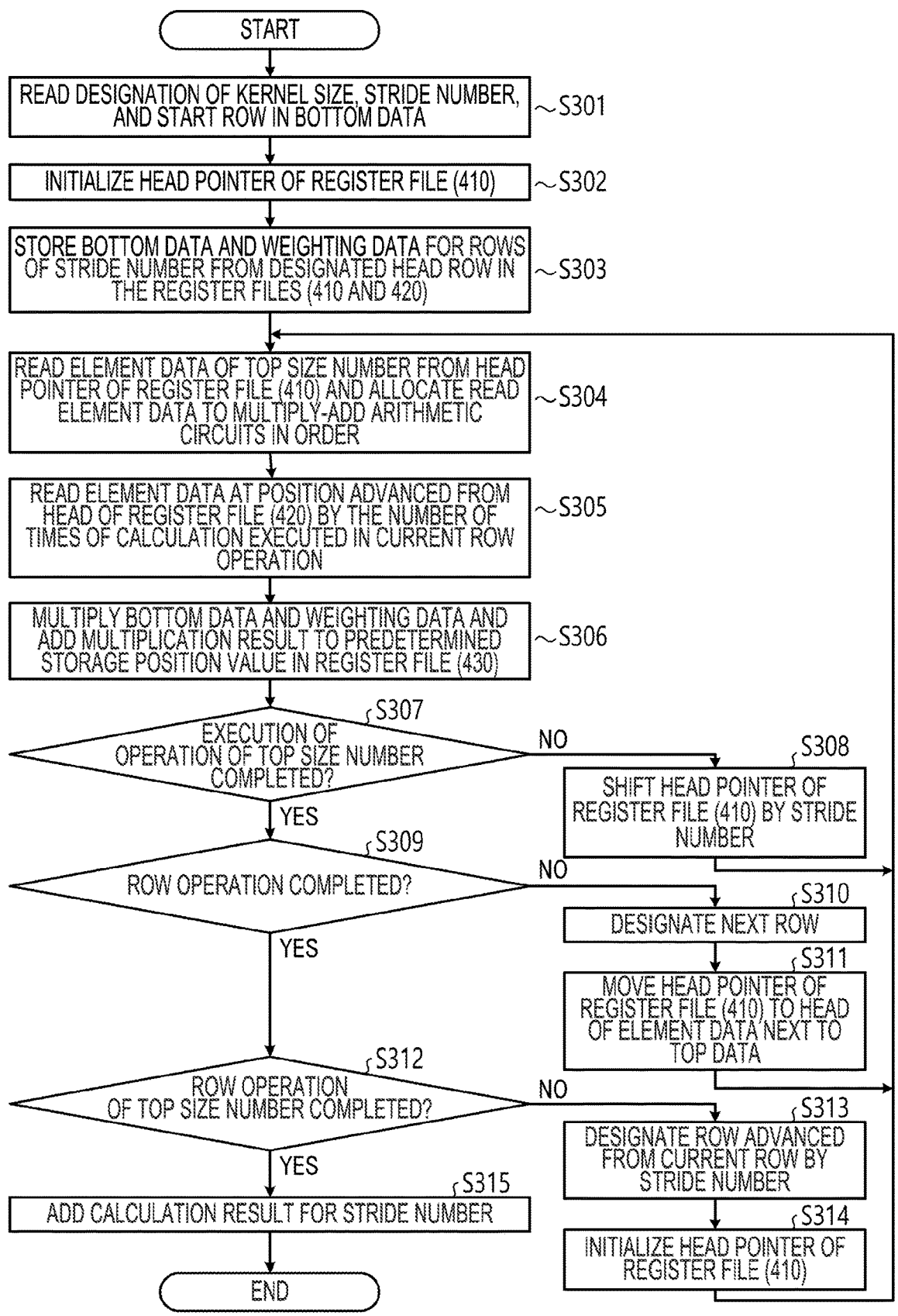
FIG. 19 is a flowchart of a forward multiply-add operation according to a third embodiment.

Next, the flow of forward multiply-add operation according to the third embodiment will be described in detail with reference to FIG. 19. FIG. 18 is a flowchart of the forward multiply-add operation according to the third embodiment.

The arithmetic circuit 51 reads the kernel size, the stride number, and the start row in the bottom data designated by the operator (step S301).

The pointer control circuit 16 initializes the head pointer of the register file 410 (step S302).

Next, the first data control circuit 12 and the second data control circuit 13 store the bottom data 201 and the weighting data 202 for the rows of the stride number from a designated head row in the register files 410 and 420, respectively (step S303).

The arithmetic circuit 51 reads the element data of the top size number from the head pointer of the register file 410 and allocates the element data to the multiply-add arithmetic circuits 501 to 503 of the number obtained by multiplying the stride number by the top size in order (step S304).

Further, the arithmetic circuit 51 reads the element data at the position advanced by the number of times of calculation executed in the current row operation from the head of the register file 420 and allocates the element data to the multiply-add arithmetic circuits 501 to 503 in order (step S305).

The multiply-add arithmetic circuits 501 to 503 multiply the acquired element data of the bottom data 201 and the acquired element data of the weighting data 202, and add the multiplication result to the corresponding predetermined storage position in the register file 430 (step S306).

The arithmetic circuit 51 determines whether the operation of steps S304 to S306 has been completed by the top size number (step S307). When it is determined that the operation has not been completed by the top size number ("No" in step S307), the pointer control circuit 16 shifts the head pointer of the register file 410 by the number of multiply-add arithmetic circuits 501 to 503, that is, by the stride number (step S308). Thereafter, the arithmetic circuit 51 returns to step S304.

In the meantime, when it is determined that the operation has been completed by the top size number ("Yes" in step S307), the arithmetic circuit 51 determine whether the row operation has been completed, depending on whether the execution of the operation of steps S304 to S307 has been completed by the top size number (step S309). When it is determined that the row operation has not been completed ("No" in step S309), the arithmetic circuit 51 designates the next row as a row serving as an operation target of the bottom data 201 and the weighting data 202 (step S310)

Next, the pointer control circuit 16 disposes the head pointer 161 of the register file 410 on the head in the calculation of the next element data of the top data 209 (step S311). In other words, the pointer control circuit 16 disposes the head pointer 161 at the position advanced by the stride number from the position of the first head pointer 161 in the previous operation from step S304 to step S307. Thereafter, the arithmetic circuit 51 returns to step S304.

In the meantime, when it is determined that the row operation has been completed ("Yes" in step S309), the arithmetic circuit 51 determines whether the calculation of the element data of the top size number has been completed (step S312). When it is determined that the calculation of the element data of the top size number has not been completed ("No" in step S312), the arithmetic circuit 51 designates a row advanced by the stride number as a row serving as an operation target of the bottom data 201 and the weighting data 202 (step S313).

Next, the pointer control circuit 16 initializes the head pointer 161 of the register file 410 (step S314). In this case, the head pointer of the register file 410 is moved to the head of the row stored in the register file 410. Thereafter, the arithmetic circuit 51 returns to step S304.

In the meantime, when it is determined that the calculation of the element data of the top size number has been completed ("Yes" in step S312), the arithmetic circuit 51 adds the calculation results for the stride number (step S315). Thus, each element data of the top data 209 is calculated.

As described above, the arithmetic processing device according to the third embodiment executes the convolution forward operation with a configuration in which multiply-add arithmetic circuits of the number obtained by multiplying the stride number and the top size are arranged in one arithmetic circuit. Even in this case, it is possible to avoid conflicts at the time of data reading and shorten calculation time.

Figure 20:
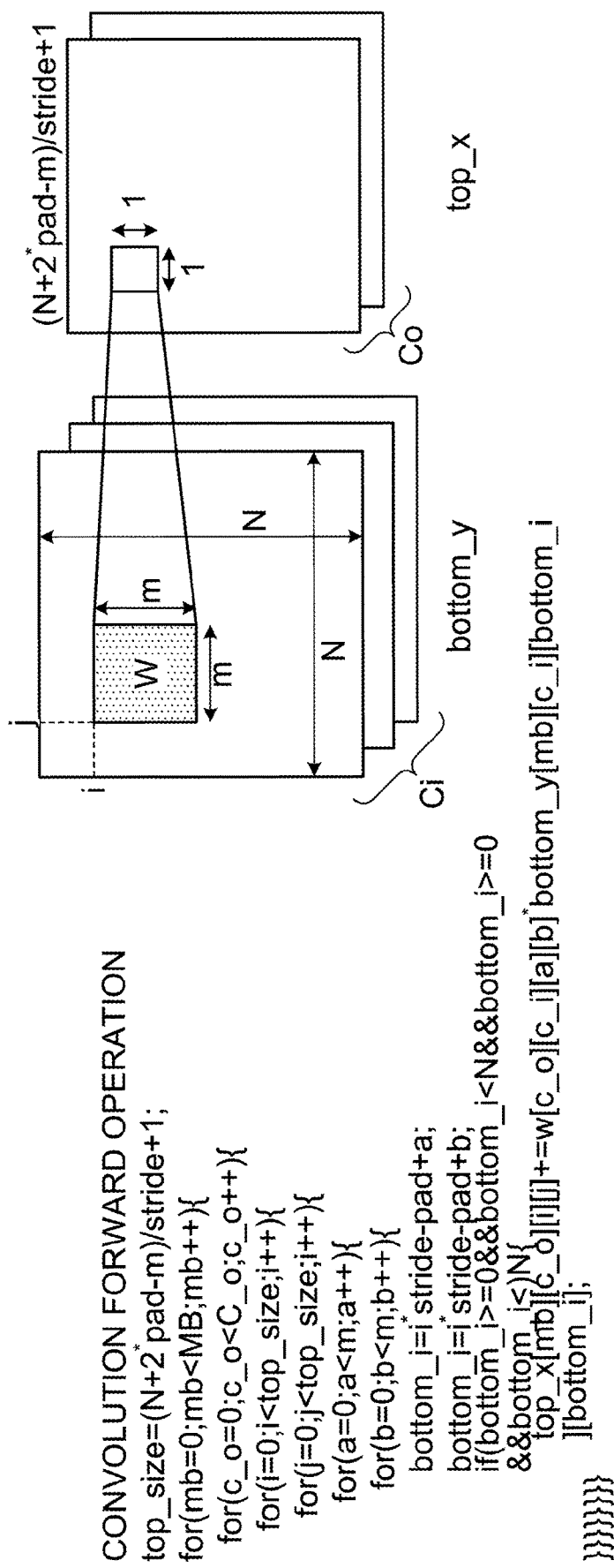
FIG. 20 is a view for describing an example of description of a convolution forward operation program using plural arithmetic circuits.

FIG. 20 is a view for explaining a description example of a convolution forward operation program using plural arithmetic circuits. As illustrated in FIG. 20, the convolution forward operation may be expressed by multiplication and addition using bottom data 201 (bottom_y) and top difference data 203 (top_x). The convolution forward operation is performed by specifying a data number Ci of the bottom data 201, a data number Co of the top difference data 203, a batch number mb, a stride number W, and a pad number pad which is a parameter for adjusting the top size. Here, the adjustment of the top size corresponds to the increase of the top size.

(Hardware Configuration)

Figure 21:
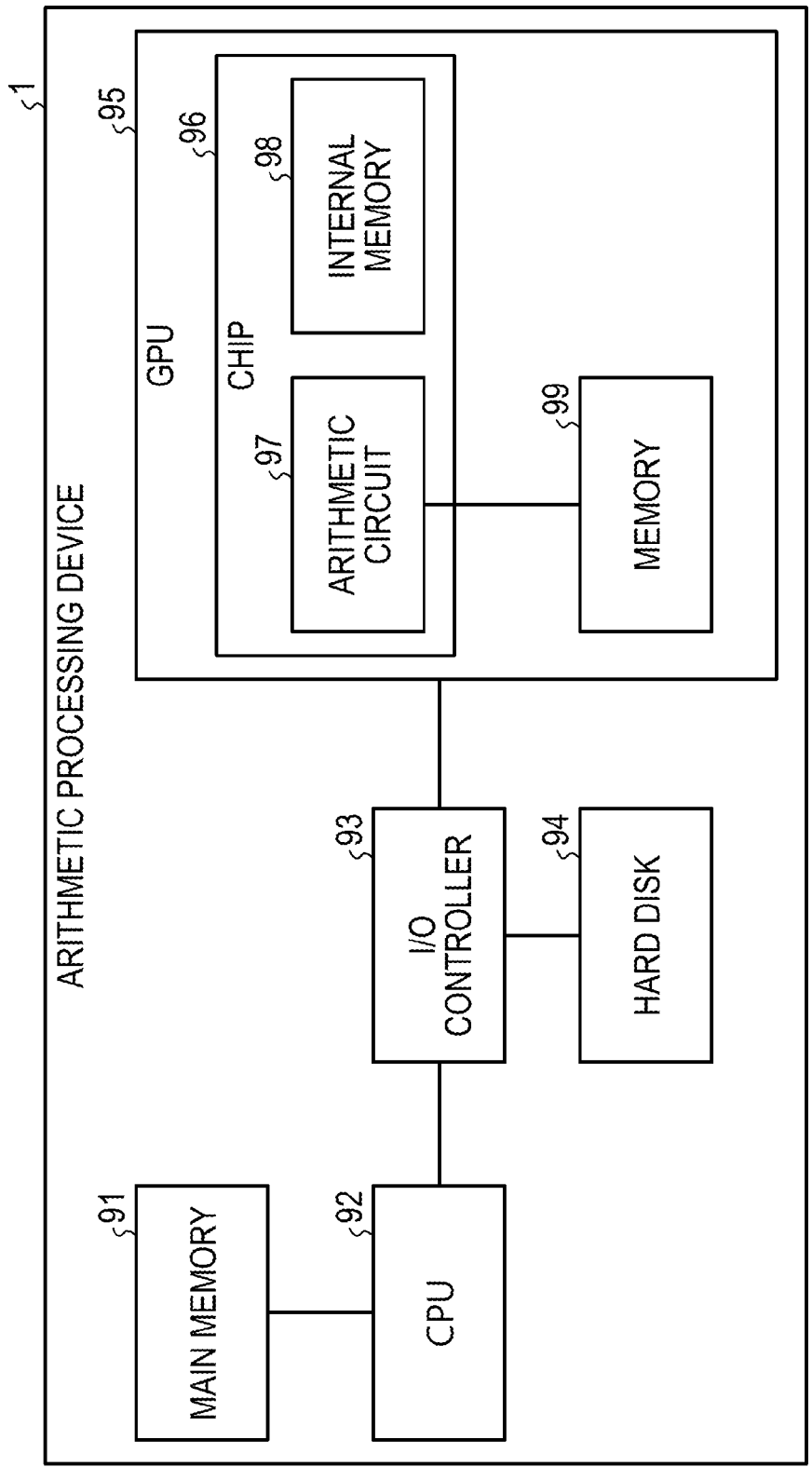
FIG. 21 is a hardware configuration diagram of an arithmetic processing device.

FIG. 21 is a hardware configuration diagram of an arithmetic processing device. Referring to FIG. 21, the arithmetic processing device 1 includes a main memory 91, a CPU (Central Processing Unit) 92, an I/O (Input/Output) controller 93, a hard disk 94, and a GPU 95. The GPU 95 includes a chip 96 and a memory 99. An arithmetic circuit 97 and an internal memory 98 are mounted on the chip 96.

As an example, the CPU 92 executes software for managing a neural network and stores the bottom data 201 and the weighting data 202 to be used by the software in the main memory 91. Then, the software for managing the neural network requests the GPU 95 for operation. At that time, the bottom data 201 and the weighting data 202 are moved to the memory 99 so that resources on the GPU 95 may be used to execute the operation.

The arithmetic circuit 97 implements the function of the arithmetic circuit 50. The memory 99 implements the function of the memory 11. The internal memory 98 implements the functions of the register files 410, 420, and 430. In this case, the arithmetic circuit 97 implements the functions of the first data control circuit 12, the second data control circuit 13, and the pointer control circuit 16. For example, various programs including programs for implementing the functions of the arithmetic circuit 50, the first data control circuit 12, the second data control circuit 13, and the pointer control circuit 16 are stored in the memory 99. Then, the arithmetic circuit 97 may read and execute the various programs from the memory 99 to implement the functions of the arithmetic circuit 50, the first data control circuit 12, the second data control circuit 13, and the pointer control circuit 16. In this manner, the functions described in the above embodiments may be implemented by the GPU 95.

Figure 22:
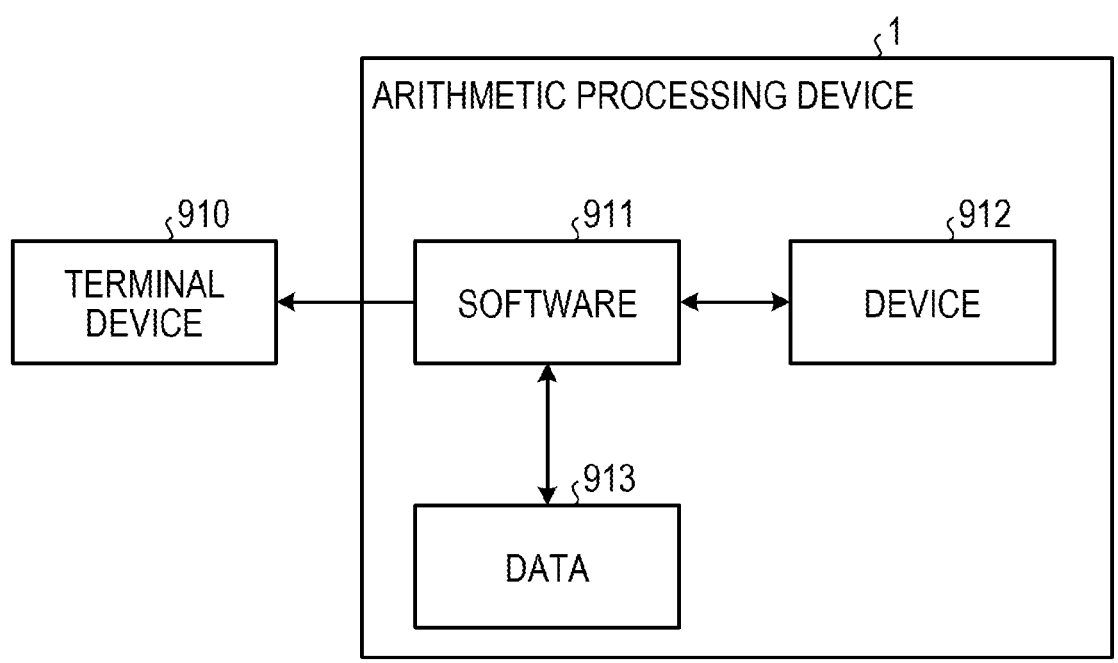
FIG. 22 is a view for explaining a case where a convolution forward operation is performed by an I/O device.

FIG. 22 is a view for explaining a case where the convolution forward operation is performed by an I/O device. In this case, the arithmetic processing device 1 has data 913, software 911 is executed, and each function described in each embodiment is implemented by a device 912.

The data 913 is data input from a terminal device 910 and includes network configuration information such as bottom data 201, weighting data 202, an expected value, a bottom size, a kernel number, and a stride number.

The software is implemented by the CPU 92 in FIG. 21. Then, the software 911 generates a micro program and gives an operation instruction to the device 912. Further, the software 911 acquires the network configuration information from the data 913 and notifies it to the device 912.

The device 912 is an I/O device and is implemented by the GPU 95 in FIG. 21. The device 912 implements the functions of the arithmetic circuit 50, the first data control circuit 12, the second data control circuit 13, and the pointer control circuit 16 in response to the operation instruction from the micro program generated by the software 911.

As another example, the software for managing the neural network operating on the CPU 92 may request other cores of the CPU 92 for operation. In that case, the CPU 92 implements the function of the arithmetic circuit 50. The hard disk 94 implements the function of the memory 11. The main memory 91 implements the functions of the register files 410 to 430. The hard disk 94 exchanges data with the CPU 92 via the I/O controller 93. In this case, the CPU 92 implements the functions of the first data control circuit 12, the second data control circuit 13, and the pointer control circuit 16. For example, various programs including programs for implementing the functions of the arithmetic circuit 50, the first data control circuit 12, the second data control circuit 13, and the pointer control circuit 16 are stored in the hard disk 94. Then, the CPU 92 may read and execute the various programs from the hard disk 94 to implement the functions of the arithmetic circuit 50, the first data control circuit 12, the second data control circuit 13, and the pointer control circuit 16. In this manner, the functions described in the above embodiments may also be implemented by using the CPU 92 other than the GPU 95 of the arithmetic processing device 1.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An arithmetic processing device which performs an operation using a first matrix having first element data and a second matrix having second element data to obtain a third matrix having third element data, the arithmetic processing device comprising:

a memory configured to store the first matrix and the second matrix;

a plurality of arithmetic circuits;

a first memory arranged for each of the arithmetic circuits and configured to store a first predetermined row having the first element data by a predetermined number of rows in the first matrix stored in the memory;

a second memory arranged for each of the arithmetic circuits and configured to store a second predetermined row having the second element data by the predetermined number of rows in the second matrix stored in the memory; and a plurality of multiply-add arithmetic circuits arranged for each of the arithmetic circuits, a number of the multiply-add arithmetic circuits corresponding to multiplying the predetermined number and a number of columns of the third matrix, each of the arithmetic circuits performs a read operation of sequentially reading the first element data of a number equivalent to multiplying the predetermined number and a number of columns of the third matrix, from a reading position of the first predetermined row stored in the first memory, into the multiply-add arithmetic circuits, respectively, while sequentially and repetitively reading the second element data of the predetermined number, from a reading position of the second predetermined row stored in the second memory, into the multiply-add arithmetic circuits, respectively, and each of the multiply-add arithmetic circuits performs:

a first operation of executing a process of acquiring the first element data and the second element data by the read operation, and multiplying the read first element data and the read second element data;

a second operation of repeating a process of performing the first operation while advancing the read position of the first element data in the first predetermined row and the read position of the second element data in the second predetermined row in the row direction, by the number of columns of the third matrix;

a third operation of repeating the second operation while advancing the first predetermined row and the second predetermined row, row by row, by a number of rows of the second matrix;

and calculating the third element data based on an operation result of the third operation to obtain the third matrix.

2. The arithmetic processing device according to claim 1, wherein a number of the arithmetic circuits corresponds to a number of columns of the third matrix.

3. The arithmetic processing device according to claim 1, wherein each of the multiply-add arithmetic circuits performs:

a fourth operation of repeating the third operation while advancing the first predetermined row and the second predetermined row in a column direction by the predetermined number; and calculating the third element data based on an operation result of the fourth operation to obtain the third matrix.

4. A control method for an arithmetic processing device which performs an operation using a first matrix having first element data and a second matrix having second element data to obtain a third matrix having third element data, the arithmetic processing device including a memory; a plurality of arithmetic circuits; a first memory arranged for each of the arithmetic circuits; a second memory arranged for each of the arithmetic circuits; and a plurality of multiply-add arithmetic circuits arranged for each of the arithmetic circuits, a number of the multiply-add arithmetic circuits corresponding to multiplying a predetermined number of rows and a number of columns of the third matrix, the control method comprising:

storing the first matrix and the second matrix in a memory;

storing a first predetermined row having the first element data by the predetermined number of rows in the first matrix stored in the memory in the first memory;

storing a second predetermined row having the second element data by the predetermined number of rows in the second matrix stored in the memory in the second memory, and performing of a read operation of sequentially reading a number of the first element data equivalent to multiplying the predetermined number and a number of columns of the third matrix, from a reading position of the first predetermined row stored in the first memory, into the multiply-add arithmetic circuits, respectively, while sequentially and repetitively reading the second element data of the predetermined number, from a reading position of the second predetermined row stored in the second memory, into the multiply-add arithmetic circuits, respectively;

performing a first operation of executing a process of acquiring the first element data and the second element data by the read operation, and multiplying the read first element data and the read second element data, by each of the multiply-add arithmetic circuits;

performing a second operation of repeating a process of performing the first operation while advancing the read position of the first element data in the first predetermined row and the read position of the second element data in the second predetermined row in the row direction, by the number of columns of the third matrix, by each of the multiply-add arithmetic circuits;

performing a third operation of repeating the second operation while advancing the first predetermined row and the second predetermined row, row by row, by a number of rows of the second matrix, by each of the multiply-add arithmetic circuits;

and calculating the third element data based on an operation result of the third operation to obtain the third matrix.

5. The control method according to claim 4, further comprising:

performing a fourth operation of repeating the third operation while advancing the first predetermined row and the second predetermined row in a column direction by the predetermined number; and calculating the third element data based on an operation result of the fourth operation to obtain the third matrix.

* * * * *